(12) United States Patent
Fujisawa

(10) Patent No.: US 8,125,854 B2
(45) Date of Patent: Feb. 28, 2012

(54) SATELLITE SIGNAL RECEPTION DEVICE, TIMEKEEPING DEVICE, AND SATELLITE SIGNAL RECEPTION METHOD

(75) Inventor: Teruhiko Fujisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 302 days.

(21) Appl. No.: 12/569,665

(22) Filed: Sep. 29, 2009

(65) Prior Publication Data

US 2010/0091614 A1    Apr. 15, 2010

(30) Foreign Application Priority Data

Oct. 9, 2008    (JP) .................................. 2008-262633

(51) Int. Cl.
  *G04B 47/00*    (2006.01)
  *G01S 19/24*    (2010.01)
(52) U.S. Cl. ..................................... 368/47; 342/357.63
(58) Field of Classification Search .................... 368/46, 368/47; 342/356, 357.44, 357.66, 357.74, 342/357.6, 357.743, 357.39, 357.51, 357.63
  See application file for complete search history.

(56) References Cited

U.S. PATENT DOCUMENTS 5,592,173 A * 1/1997 Lau et al. ................. 342/357.74
(Continued)

FOREIGN PATENT DOCUMENTS

JP    3789556 B2    1/1998
(Continued)

*Primary Examiner* — Vit Miska

(57) ABSTRACT

A satellite signal reception device according to an aspect of the invention comprises a reception operation unit that executes a reception operation process to receive a satellite signal transmitted from a positioning information satellite and generates positioning information from the satellite signal. The satellite signal has precise and coarse information orbit periods containing precise and coarse orbit information respectively for the positioning information satellite. The reception operation unit executes the reception operation process in the precise orbit information period, uses the coarse orbit information period as a suspended reception period, and pauses at least a part of the reception operation process in the suspended reception period.

9 Claims, 15 Drawing Sheets

U.S. PATENT DOCUMENTS

| | | | |
|---|---|---|---|
| 6,437,735 B1 * | 8/2002 | McMahan | 342/357.66 |
| 6,727,848 B2 * | 4/2004 | Eschenbach | 342/357.46 |
| 7,348,921 B2 * | 3/2008 | Yu | 342/357.63 |
| 7,355,551 B2 * | 4/2008 | Xie et al. | 342/357.63 |
| 7,457,203 B2 * | 11/2008 | Nakagawa | 368/47 |
| 7,570,208 B2 * | 8/2009 | Wang et al. | 342/357.63 |
| 7,830,304 B2 * | 11/2010 | Mattos | 342/357.23 |
| 2004/0252053 A1 * | 12/2004 | Harvey | 342/357.15 |
| 2004/0263386 A1 * | 12/2004 | King et al. | 342/357.06 |
| 2007/0210957 A1 * | 9/2007 | Brodie et al. | 342/357.06 |
| 2008/0025151 A1 * | 1/2008 | Urano et al. | 368/14 |
| 2008/0117103 A1 | 5/2008 | Wang et al. | |
| 2008/0175105 A1 * | 7/2008 | Urano et al. | 368/47 |
| 2009/0034372 A1 * | 2/2009 | Fujisawa | 368/14 |

FOREIGN PATENT DOCUMENTS

| | | |
|---|---|---|
| JP | 2005-106720 A | 4/2005 |
| JP | 2008-032636 | 2/2008 |
| JP | 2008-032638 | 2/2008 |
| WO | 98/32027 A1 | 7/1998 |
| WO | 02/21150 A2 | 3/2002 |

* cited by examiner

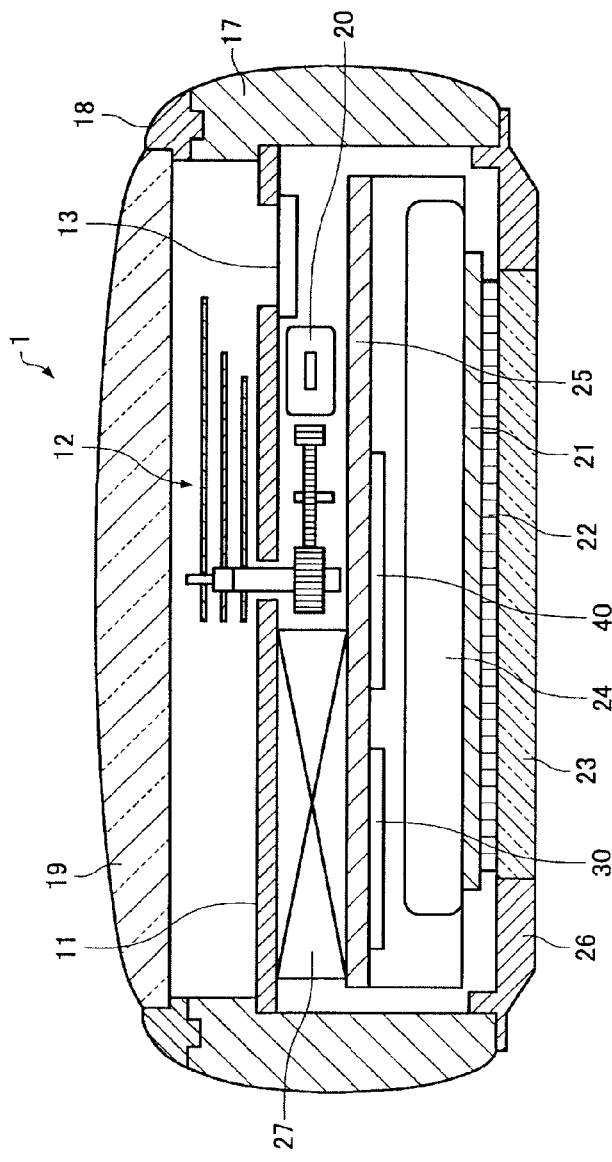
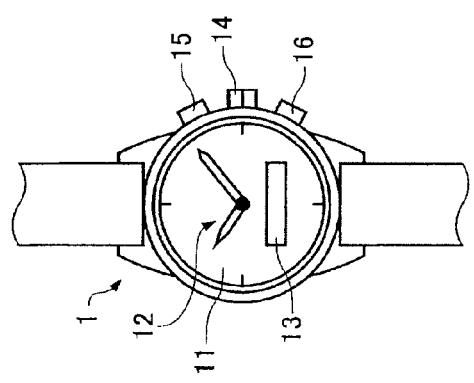
FIG. 3B
FIG. 3A

SATELLITE SIGNAL RECEPTION DEVICE, TIMEKEEPING DEVICE, AND SATELLITE SIGNAL RECEPTION METHOD

CROSS-REFERENCE TO RELATED APPLICATION(S)

Japanese Patent application No. 2008-262633 is hereby incorporated by reference in its entirety.

BACKGROUND

1. Field of Invention

The present invention relates to a satellite signal reception device, a timekeeping device, and a satellite signal reception method.

2. Description of Related Art

The Global Positioning System (GPS), which is a system in which satellites (GPS satellites) orbiting the Earth on known orbits transmit signals (satellite signals) carrying superposed time information and orbit information, and a terrestrial receiver (GPS receiver) receives these signals (satellite signals) to determine its own position, is widely known.

The GPS receiver captures signals from a plurality of GPS satellites, acquires satellite information including accurate time information (GPS time information) and orbit information from each of the captured satellites, performs a positioning calculation using the acquired satellite information, and thereby acquires its own location. The time required to acquire the satellite information therefore depends upon the strength of the satellite signal, and the positioning calculation can take a long time to converge.

Japanese Unexamined Patent Appl. Pub. JP-A-2005-106720 teaches a GPS receiver that stores previously acquired satellite orbit information (such as the almanac parameters) in backup memory, and has a warm start mode and a cold start mode. The warm start mode uses the information stored in backup memory to predict the GPS satellites that can be currently acquired, and shortens the time required from startup to determining the position by attempting to capture those satellites. In the cold start mode the GPS receiver sequentially attempts to capture all of the GPS satellites in the constellation.

The power consumption required from startup to positioning is preferably as little as possible in applications where low power consumption is needed.

When there are few opportunities to acquire the positioning information and the interval between such opportunities is long (such as in a timepiece that adjusts the time difference based on the positioning information), however, the valid period (several weeks in the GPS system) of the previously acquired satellite orbit information (such as the almanac parameters) is often passed. This results in the GPS receiver always starting up in the cold start mode with almost no chance to start in the warm start mode.

SUMMARY OF INVENTION

A satellite signal reception device, timekeeping device, and satellite signal reception method according to the present invention are directed to solving the foregoing problem and enable reducing power consumption.

(1) A satellite signal reception device according to a first aspect of the invention is a satellite signal reception device that has a reception operation unit that executes a reception operation process to receive a satellite signal transmitted from a positioning information satellite and generate positioning information from the satellite signal. The satellite signal has at least a precise orbit information period containing precise orbit information for the positioning information satellite, and a coarse orbit information period containing coarse orbit information for the positioning information satellite. The reception operation unit executes the reception operation process in the precise orbit information period, uses the coarse orbit information period as a suspended reception period, and pauses at least a part of the reception operation process in the suspended reception period.

The satellite information includes time information kept by the positioning information satellite and positioning information satellite orbit information, for example.

The precise orbit information is detailed orbit information for the positioning information satellite that transmitted a particular satellite signal. For example, in the case of a GPS satellite, the precise orbit information corresponds to the ephemeris parameters, and the precise orbit information period is the period in which subframes 2 and 3 of the navigation message are transmitted.

The coarse orbit information is approximate orbit information for all positioning information satellites in the constellation. For example, if the positioning information satellite is a GPS satellite, the coarse orbit information corresponds to the almanac data, and the coarse orbit information period corresponds to the period when subframes 4 and 5 of the navigation message are transmitted.

The invention acquires the precise orbit information required to generate the positioning information, and suspends at least a part of the reception operation process during the period in which the coarse orbit information that is not needed to generate the positioning information is transmitted. As a result, the current consumption of the satellite signal reception device can be reduced.

(2) In a satellite signal reception device according to a second aspect of the invention, the satellite signal has a satellite correction information period containing satellite correction data, and the satellite correction information period is used as a suspended reception period.

The satellite correction information includes a clock correction value (time correction parameter) and satellite health information for the positioning information satellite transmitting the satellite signal. For example, if the positioning information satellite is a GPS satellite, the satellite correction information corresponds to the satellite correction data, and the satellite correction information period corresponds to the period in which subframe 1 of the navigation message is transmitted.

This aspect of the invention acquires the precise orbit information required to generate the positioning information, and suspends at least a part of the reception operation process during the period in which the coarse orbit information and the satellite correction information that are not needed to generate the positioning information are transmitted. As a result, the current consumption of the satellite signal reception device can be reduced.

(3) In a satellite signal reception device according to a third aspect of the invention the satellite signal has a satellite correction information period containing satellite correction data, and the satellite correction information period is used as a suspended reception period in the period until the reception operation process is completed after the first satellite correction data is acquired after the reception operation process starts.

After the first satellite correction data is acquired in the reception operation process, this aspect of the invention acquires the precise orbit information required to generate the positioning information, and suspends at least a part of the reception operation process during the period in which the coarse orbit information and the satellite correction information that are not needed to generate the positioning information are transmitted. As a result, the current consumption of the satellite signal reception device can be reduced.

(4) In a satellite signal reception device according to another aspect of the invention the satellite signal has a satellite correction information period containing satellite correction data, and the satellite correction information period is used as a suspended reception period for a specific time after acquiring the satellite correction data.

For a specific time after acquiring the satellite correction data, this aspect of the invention acquires the precise orbit information required to generate the positioning information, and suspends at least a part of the reception operation process during the period in which the coarse orbit information and the satellite correction information that are not needed to generate the positioning information are transmitted. As a result, the current consumption of the satellite signal reception device can be reduced.

(5) In a satellite signal reception device according to another aspect of the invention the reception operation process includes a reception process for receiving a satellite signal transmitted from a positioning information satellite, and a positioning information generating process for generating positioning information based on the precise orbit information contained in the satellite signal, and the reception operation unit suspends at least a part of the reception process during the suspended reception period.

This aspect of the invention suspends at least a part of the reception process in the suspended reception period. As a result, the positioning information generating process can continue while the current consumption of the satellite signal reception device is reduced.

(6) In a satellite signal reception device according to another aspect of the invention the reception operation unit suspends at least a part of the positioning information generating process in the suspended reception period.

This aspect of the invention suspends at least part of the positioning information generating process in addition to at least part of the reception process in the suspended reception period. As a result, the current consumption of the satellite signal reception device can be further reduced.

(7) A satellite signal reception device according to another aspect of the invention also has a first storage unit that stores data required for the reception operation process, and the first storage unit stores the data during the suspended reception period.

This aspect of the invention can quickly resume the reception operation process because the data required for the reception operation process is stored even during the suspended reception period.

(8) In a satellite signal reception device according to another aspect of the invention the data includes at least one of frequency offset data, pseudorange data, precise orbit information, satellite time data, and satellite correction data for the positioning information satellite from which a satellite signal is received.

This aspect of the invention can quickly resume the reception operation process because at least one of the frequency offset data, pseudorange data, and satellite time data is stored even during the suspended reception period.

(9) The satellite signal reception device according to another aspect of the invention also has a second storage unit. The reception operation unit executes a coarse orbit information generating process that generates data corresponding to coarse orbit information from the precise orbit information, and the second storage unit stores the data corresponding to the coarse orbit information.

This aspect of the invention can generate and store information corresponding to the coarse orbit information from the precise orbit information without receiving the coarse orbit information. Therefore, by using this information corresponding to the coarse orbit information when the next reception operation process starts, the time required from when the reception operation process starts until a positioning information satellite is captured can be shortened by predicting and attempting to capture the positioning information satellites that can currently be captured.

(10) In a satellite signal reception device according to another aspect of the invention the positioning information satellite is a GPS satellite.

(11) Another aspect of the invention is a timekeeping device having the satellite signal reception device described herein, a timekeeping unit that keeps internal time information, and a time adjustment unit that corrects the internal time information. The reception operation unit generates time difference adjustment information based on the positioning information, and the time adjustment unit corrects the internal time information based on the time difference adjustment information.

This aspect of the invention can correct the time difference based on the positioning information generated from a satellite signal while reducing power consumption.

(12) Another aspect of the invention is a satellite signal reception method that receives a satellite signal transmitted from a positioning information satellite and generates positioning information from the satellite signal, the satellite signal having at least a precise orbit information period containing precise orbit information for the positioning information satellite, and a coarse orbit information period containing coarse orbit information for the positioning information satellite. The satellite signal reception method includes steps of executing a reception operation process to receive the satellite signal in the precise orbit information period and generate positioning information from the satellite signal, and pausing at least a part of the reception operation process in the coarse orbit information period.

This aspect of the invention acquires the precise orbit information required to generate the positioning information, and suspends at least a part of the reception operation process during the period in which the coarse orbit information that is not needed to generate the positioning information is transmitted. As a result, a satellite signal reception method that reduces current consumption can be achieved.

BRIEF DESCRIPTION OF THE DRAWINGS

FIG. 3A and FIG. 3B describe the configuration of a GPS wristwatch according to a first embodiment of the invention.

DESCRIPTION OF THE PREFERRED EMBODIMENTS

Preferred embodiments of the present invention are described below with reference to the accompanying figures. Note that the embodiments described below do not unduly limit the scope of the invention described in the accompanying claims. In addition, the invention does not necessary require all aspects of the configurations described below.

1. GPS System 1-1 Summary

Figure 1:
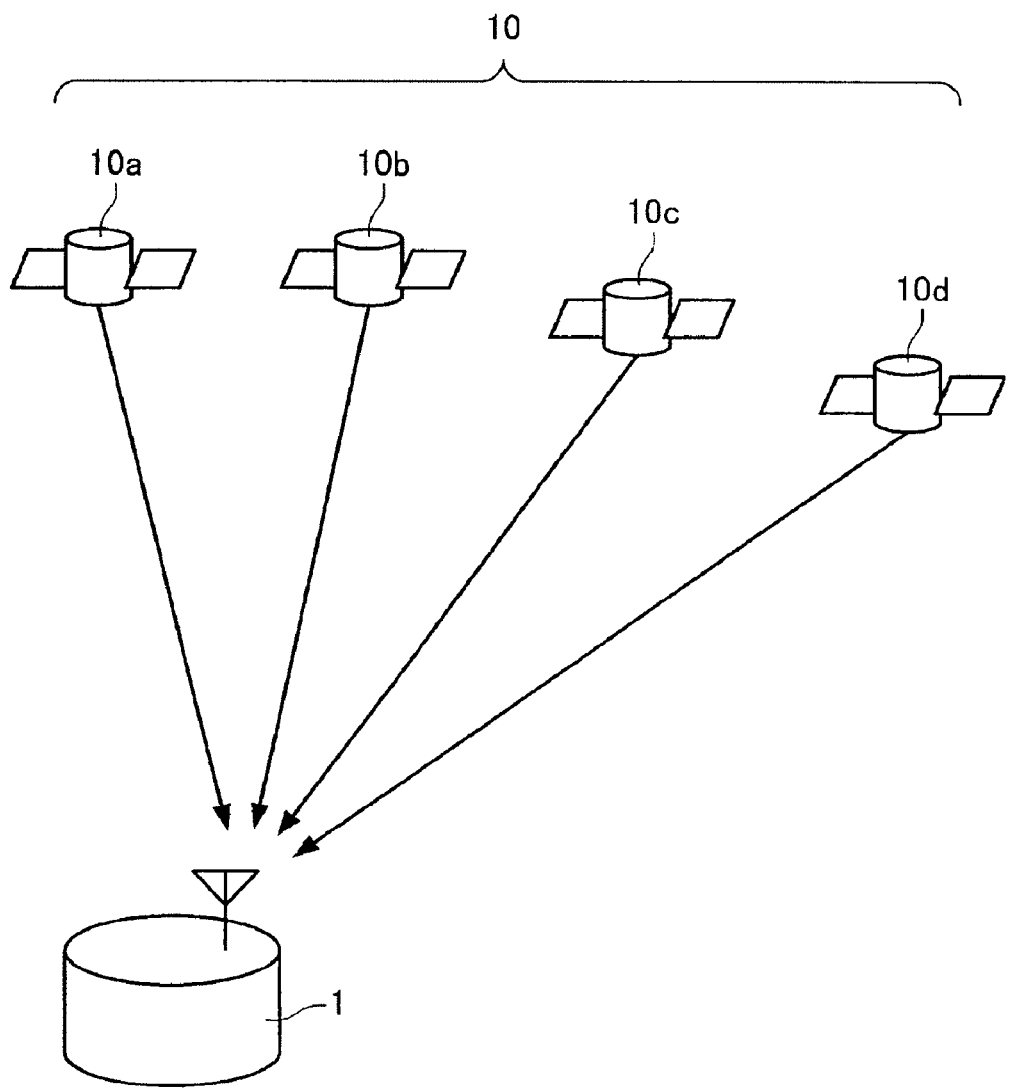
FIG. 1 schematically describes the GPS system.

FIG. 1 schematically describes a GPS system.

GPS satellites 10 orbit the Earth on specific known orbits and transmit navigation messages superposed to a 1.57542 GHz carrier (L1 signal) to Earth. Note that a GPS satellite 10 is an example of a positioning information satellite in a preferred embodiment of the invention, and the 1.57542 GHz carrier signal with a superposed navigation message (referred to below as the "satellite signal") is an example of a satellite signal in a preferred embodiment of the invention.

There are currently approximately 30 GPS satellites 10 in orbit (of the approximately 30 GPS satellites in the constellation, only the four GPS satellites 10a, 10b, 10c, and 10d are shown in FIG. 1), and in order to identify the GPS satellite 10 from which a satellite signal was transmitted, each GPS satellite superposes a unique 1023 chip (1 ms period) pattern called a Coarse/Acquisition Code (CA code) to the satellite signal. The C/A code is an apparently random pattern in which each chip is either +1 or −1. The C/A code superposed to the satellite signal can therefore be detected by correlating the satellite signal with the pattern of each C/A code.

Each GPS satellite 10 has an atomic clock on board, and the satellite signal carries the extremely accurate time information (called the "GPS time information" below) kept by the atomic clock. The miniscule time difference of the atomic clock on board each GPS satellite 10 is measured by a terrestrial control segment, and a time correction parameter for correcting the time difference is also contained in the satellite signal. A GPS receiver 1 can therefore receive the satellite signal transmitted from one GPS satellite 10 and adjust the internally kept time to the correct time by using the GPS time information and time correction parameter contained in the received signal.

Orbit information describing the location of the GPS satellite 10 on its orbit is also contained in the satellite signal. The GPS receiver 1 can perform a positioning calculation using the GPS time information and the orbit information. This positioning calculation assumes that there is a certain amount of error in the internal time kept by the GPS receiver 1. More specifically, in addition to the x, y, and z parameters for identifying the three-dimensional position of the GPS receiver 1, the time difference is also an unknown value. As a result, a GPS receiver 1 generally receives satellite signals transmitted from four or more GPS satellites, and performs the positioning calculation using the GPS time information and orbit information contained in the received signals.

1-2 Navigation Message

Figure 2A:
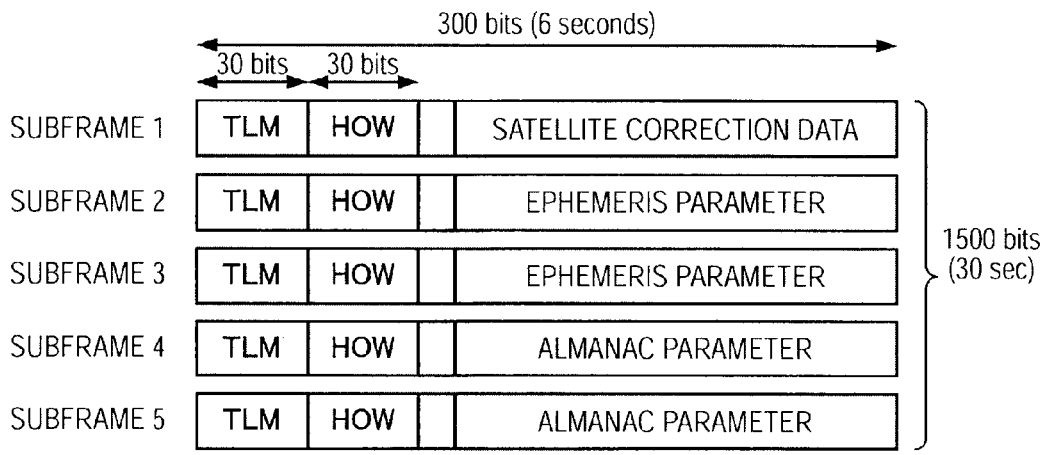
FIG. 2A to FIG. 2C describe the structure of the navigation message.
Figure 2B:
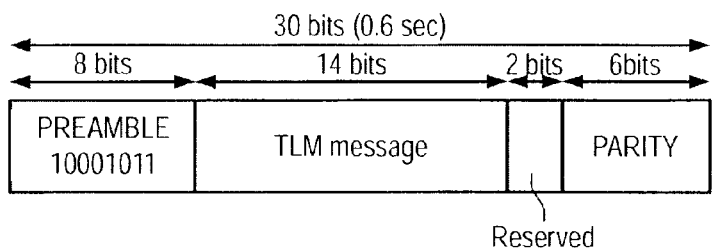
Figure 2C:
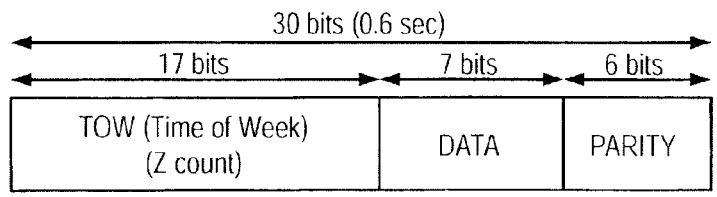

FIG. 2A to FIG. 2C describe the structure of the navigation message.

As shown in FIG. 2A, the navigation message is composed of data organized in a single main frame containing a total 1500 bits. The main frame is divided into five subframes of 300 bits each. The data in one subframe is transmitted in 6 seconds from each GPS satellite 10. It therefore requires 30 seconds to transmit the data in one main frame from each GPS satellite 10.

Subframe 1 contains satellite correction data such as the week number (WN) and time correction parameter. The week number identifies the week to which the current GPS time information belongs. The GPS time starts at 00:00:00 on Jan. 6, 1980, and the number of the week that started that day is week number 0. The week number is updated every week.

Subframes 2 and 3 contain ephemeris data, that is, detailed orbit information for each GPS satellite 10. Subframes 4 and 5 contain almanac data (general orbit information for all GPS satellites 10 in the constellation).

Each of subframes 1 to 5 starts with a telemetry (TLM) word containing 30 bits of telemetry (TLM) data, followed by a HOW word containing 30 bits of HOW (handover word) data.

Therefore, while the TLM words and HOW words are transmitted at 6-second intervals from the GPS satellite 10, the week number data and other satellite correction data, ephemeris data, and almanac data are transmitted at 30-second intervals.

As shown in FIG. 2B, the TLM word contains preamble data, a TLM message, reserved bits, and parity data.

As shown in FIG. 2C, the HOW word contains time information called the TOW or Time of Week (also called the Z count). The Z count denotes in seconds the time passed since 00:00 of Sunday each week, and is reset to 0 at 00:00 of Sunday each week. More specifically, the Z count denotes the time passed from the beginning of each week in seconds, and the elapsed time is a value expressed in units of 1.5 seconds. Note, further, that the Z count denotes the time that the first bit of the next subframe data was transmitted. For example, the Z count transmitted in subframe 1 denotes the time that the first bit in subframe 2 is transmitted.

The HOW word also contains 3 bits of data denoting the subframe ID (also called the ID code). More specifically, the HOW words of subframes 1 to 5 shown in FIG. 2A contain the ID codes 001, 010, 011, 100, and 101, respectively.

The GPS receiver 1 can get the GPS time information by acquiring the week number value contained in subframe 1 and the HOW words (Z count data) contained in subframes 1 to 5. However, if the GPS receiver 1 has previously acquired the week number and internally counts the time passed from when the week number value was acquired, the current week number value of the GPS satellite can be obtained without acquiring the week number from the satellite signal. The GPS receiver 1 can therefore estimate the current GPS time information if the Z count is acquired. The GPS receiver 1 therefore normally acquires only the Z count as the time information.

Note that the TLM word, HOW word (Z count), satellite correction data, ephemeris, and almanac parameters are examples of satellite information in the invention.

The GPS receiver 1 may be rendered as a wristwatch with a GPS device (referred to herein as a GPS wristwatch). A GPS wristwatch is an example of a timekeeping device including a satellite signal reception device according to the present invention, and a GPS wristwatch according to this embodiment of the invention is described next.

2. GPS Wristwatch 2-1 Embodiment 1

Configuration of a GPS Wristwatch

FIG. 3A and FIG. 3B are figures describing the configuration of a GPS wristwatch according to a first embodiment of the invention. FIG. 3A is a schematic plan view of a GPS wristwatch, and FIG. 3B is a schematic section view of the GPS wristwatch in FIG. 3A.

As shown in FIG. 3A, the GPS wristwatch 1 has a dial 11 and hands 12. A display 13 is disposed in a window formed in a part of the dial 11. The display 13 may be an LCD (liquid crystal display) panel, and is used to display information such as the current latitude and longitude or the name of a city in the current time zone or location, or other message information. The hands 12 include a second hand, minute hand, and hour hand, and are driven through a wheel train by means of a stepping motor.

By manually operating the crown 14 or buttons 15 and 16, the GPS wristwatch 1 can be set to a mode ("time information acquisition mode") for receiving a satellite signal from at least one GPS satellite 10 and adjusting the internal time information, or a mode ("positioning information acquisition mode") for receiving satellite signals from a plurality of GPS satellites 10, calculating the position, and correcting the time difference of the internal time information. The GPS wristwatch 1 can also regularly (automatically) execute the time information acquisition mode or positioning information acquisition mode.

As shown in FIG. 3B, the GPS wristwatch 1 has an outside case 17 that is made of stainless steel, titanium, or other metal.

The outside case 17 is basically cylindrically shaped, and a crystal 19 is attached to the opening on the face side of the outside case 17 by an intervening bezel 18. A back cover 26 is attached to the opening on the back side of the outside case 17. The back cover 26 is annular and made of metal, and a back glass unit 23 is attached to the opening in the center.

Inside the outside case 17 are disposed a stepping motor for driving the hands 12, a GPS antenna 27, and a battery 24.

The stepping motor has a motor coil 19, a stator and a rotor, and drives the hands 12 by means of an intervening wheel train.

The GPS antenna GPS antenna 27 is an antenna for receiving satellite signals from a plurality of GPS satellites 10, and may be a patch antenna, helical antenna, or chip antenna, for example. The GPS antenna 27 is located on the opposite side of the dial 11 as the side on which the time is displayed (that is, on the back cover side), and receives RF signals through the crystal 19 and the dial 11.

The dial 11 and crystal 19 are therefore made from a material, such as plastic, that passes RF signals in the 1.5 GHz band. The bezel 18 is made from ceramic or other material with less loss of reception performance than a metal member.

A circuit board 25 is disposed on the back cover side of the GPS antenna 27, and a battery 24 is disposed on the back cover side of the circuit board 25.

Disposed to the circuit board 25 are a reception chip 18 including a reception circuit that processes satellite signals received by the GPS antenna 27, and a control chip 40 that controls, for example, driving the stepping motor. The reception chip 30 and control chip 40 are driven by power supplied from the battery 24.

The battery 24 is a lithium-ion battery or other type of rechargeable storage battery. A magnetic sheet 21 is disposed below (on the back cover side of) the battery 24. A charging coil 22 is disposed with the magnetic sheet 21 between it and the battery 24, and the battery 24 can be charged by the charging coil 22 by means of electromagnetic induction from an external charger.

The magnetic sheet 21 can also divert the magnetic field. The magnetic sheet 21 therefore reduces the effect of the battery 24 and enables the efficient transmission of energy. A back glass unit 23 is disposed in the center part of the back cover 26 to facilitate power transmission.

A lithium-ion battery or other storage battery is used as the battery 24 in this embodiment of the invention, but a lithium battery or other primary battery may be used instead. The charging method used when a storage battery is used is also not limited to charging by electromagnetic induction from an external charger through a charging coil 22. For example, a solar cell may be disposed to the GPS wristwatch 1 to generate electricity for charging the battery.

GPS Wristwatch Circuit Configuration

Figure 4:
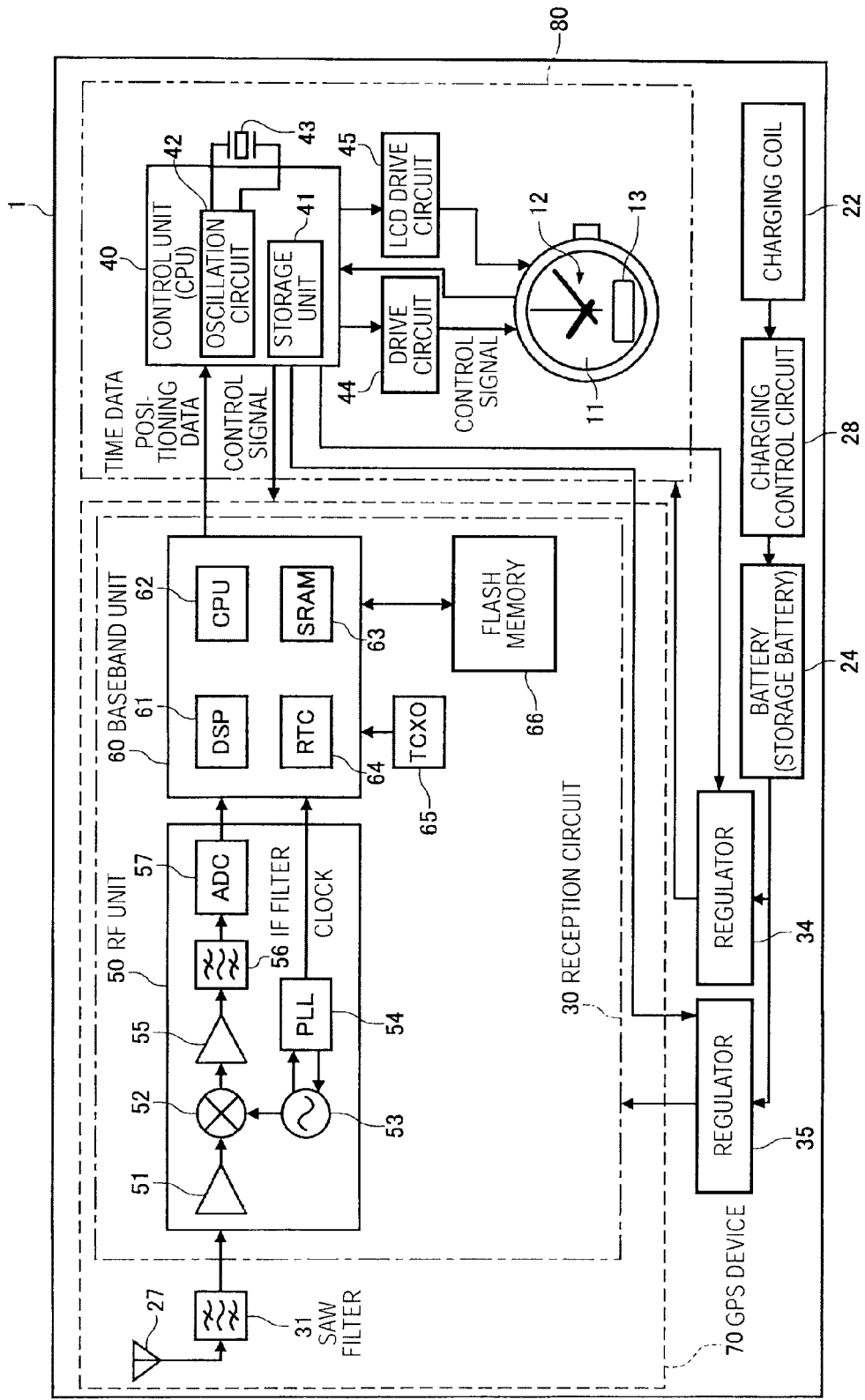
FIG. 4 describes the circuit configuration of a GPS wristwatch according to the first embodiment of the invention.

FIG. 4 describes the circuit configuration of a GPS wristwatch according to a first embodiment of the invention.

The GPS wristwatch 1 includes a GPS device 70 and a time display device 80.

The GPS device 70 includes the reception operation unit of the invention, and executes processes for receiving a satellite signal (the reception process of the invention), capturing a GPS satellite 10, generating positioning information (the positioning information generation process of the invention), and generating time adjustment information. These processes executed by the GPS device 70 correspond to the reception operation process of the invention.

The time display device 80 includes the timekeeping unit and time adjustment unit in the invention, and executes the processes for storing the internal time information and correcting the internal time information.

A charging coil 22 charges the battery 24 with electricity through the charging control circuit 28. The battery 24 supplies drive power through a regulator 34 to the GPS device 70 and through a regulator 35 to the time display device 80.

Note, further, that a regulator 35-1 (not shown in the figure) that supplies drive power to the RF unit 50 (described in detail below) and a separate regulator 35-2 (not shown in the figure) that supplies drive power to the baseband unit 60 (described in detail below) may be provided instead of regulator 35. The one regulator 35-1 may be disposed inside the RF unit 50.

GPS Device Configuration

The GPS device 70 has a GPS antenna 27 and a SAW (surface acoustic wave) filter 31. As described in FIG. 3B, the GPS antenna 27 is an antenna for receiving satellite signals from a plurality of GPS satellites 10. However, because the GPS antenna 27 also receives some extraneous signals other than satellite signals, the SAW filter 31 executes a process that extracts a satellite signal from the signal received by the GPS antenna 27. More particularly, the SAW filter 31 is rendered as a bandpass filter that passes signals in the 1.5 GHz band.

The GPS device 70 includes a reception chip (reception circuit) 30. The reception circuit 30 includes an RF (radio frequency) unit 50 and a baseband unit 60. As described below, the reception circuit 30 executes a process that acquires satellite information including orbit information and GPS time information contained in the navigation message from the 1.5 GHz satellite signal extracted by the SAW filter 31.

The RF unit 50 includes a low noise amplifier (LNA) 51, a mixer 52, a VCO (voltage controlled oscillator) 53, a PLL (phase locked loop) circuit 54, an IF (intermediate frequency) amplifier 55, and IF filter 56, and an A/D converter 57. The RF unit 50 executes the reception process according to the invention.

The satellite signal extracted by the SAW filter 31 is amplified by the LNA 51. The satellite signal amplified by the LNA 51 is mixed by the mixer 52 with a clock signal output from the VCO 53, and is down-converted to a signal in the intermediate frequency band. The PLL circuit 54 phase compares a reference clock signal and a clock signal obtained by frequency dividing the output clock signal of the VCO 53, and synchronizes the output clock signal of the VCO 53 to the reference clock signal. As a result, the VCO 53 can output a stable clock signal with the frequency precision of the reference clock signal. Note that a frequency of several megahertz can be selected as the intermediate frequency.

The signal mixed by the mixer 52 is then amplified by the IF amplifier 55. This mixing step of the mixer 52 generates a signal in the IF band and a high frequency signal of several gigahertz. As a result, the IF amplifier 55 amplifies the IF band signal and the high frequency signal of several gigahertz. The IF filter 56 passes the IF band signal and removes this high frequency signal of several gigahertz (or more particularly attenuates the signal to a specific level or less). The IF band signal passed by the IF filter 56 is then converted to a digital signal by the A/D converter 57.

The baseband unit 60 includes a DSP (digital signal processor) 61, CPU (central processing unit) 62, SRAM (static random access memory) 63, and RTC (real-time clock) 64. A TXCO (temperature-compensated crystal oscillator) 65 and flash memory 66 are also connected to baseband unit 60. The baseband unit 60 executes the positioning information generating process according to the invention. The SRAM 63 may also function as the first storage unit in the invention.

The TXCO 65 generates a reference clock signal of a substantially constant frequency irrespective of temperature.

Time difference information, for example, is stored in the flash memory 66. This time difference information is information whereby the time difference (such as the correction to UTC linked to coordinate values (such as longitude and latitude)) is defined. The flash memory 66 can be made to function as the first storage unit and second storage unit of the invention. The first storage unit and the second storage unit may be rendered by discrete storage devices or by separate storage areas in a single storage device.

When the time information acquisition mode or positioning information acquisition mode is set, the baseband unit 60 demodulates the baseband signal from the digital signal (IF band signal) output by the A/D converter 57 of the RF unit 50.

In addition, when the time information acquisition mode or positioning information acquisition mode is set, the baseband unit 60 executes a process to generate a local code of the same pattern as each C/A code, and correlate the local code with the C/A code contained in the baseband signal, in the satellite search process described below. The baseband unit 60 also adjusts the output timing of the local code to achieve the peak correlation value to each local code, and when the correlation value equals or exceeds a threshold value, determines successful synchronization with the GPS satellite 10 matching that local code (that is, determines a lock on that the GPS satellite 10). Note that the GPS system uses a CDMA (code division multiple access) system enabling all GPS satellites 10 to transmit satellite signals at the same frequency using different C/A codes. Therefore, a GPS satellite 10 that can be captured can be found by evaluating the C/A code contained in the received satellite signal.

In order to acquire the satellite information from the captured GPS satellite 10 in the time information acquisition mode and positioning information acquisition mode, the baseband unit 60 executes a process to mix the local code having the same pattern as the C/A code of the GPS satellite 10 with the baseband signal. A navigation message containing the satellite information of the captured GPS satellite 10 is demodulated in the mixed signal. In the time information acquisition mode or positioning information acquisition mode, the baseband unit 60 then executes a process of detecting the TLM word in each subframe of the navigation message (the preamble data), and acquiring (and storing in SRAM 63, for example) the satellite information including the orbit information and GPS time information contained in each subframe. The GPS time information used here is the week number (WN) and Z count data, but may be only the Z count data if the week number was previously acquired.

Based on the satellite information, the baseband unit 60 then generates the time adjustment information needed to correct the internal time information.

In the time information acquisition mode, the baseband unit 60 more specifically calculates the time based on the GPS time information, and generates the time adjustment information. The time adjustment information in the time information acquisition mode may, for example, be the GPS time information or the time difference between the GPS time information and the internal time information.

In the positioning information acquisition mode, the baseband unit 60 more specifically calculates the position based on the GPS time information and orbit information to acquire location information (and more particularly to acquire the latitude and longitude of the position where the GPS wristwatch 1 is located during reception).

The baseband unit 60 also references the time difference information stored in the flash memory 66, and acquires the time difference data correlated to the coordinates (such as the longitude and latitude) of the GPS wristwatch 1 identified from the positioning information. The baseband unit 60 then generates the satellite time data (GPS time information) and time difference data as the time adjustment information.

The time adjustment information in the positioning information acquisition mode may be the GPS time information and time difference data as described above, or instead of using the GPS time information may be data describing the time difference between the internal time information and the GPS time information.

Note, further, that the baseband unit 60 may generate time adjustment information from the satellite information from one GPS satellite 10, or it may generate the time adjustment information from the satellite information from a plurality of GPS satellites 10.

Note that operation of the baseband unit 60 is synchronized to the reference clock signal output by the TXCO 65. The RTC 64 generates the timing for processing the satellite signal. The RTC 64 counts up at the reference clock signal output from the TXCO 65.

Time Display Device Configuration

The time display device 80 includes a control chip 40 (control unit), a drive circuit 44, an LCD drive circuit 45, and a crystal oscillator 43.

The control unit 40 includes a storage unit 41 and oscillation circuit 42 and controls various operations. The control unit 40 may be rendered by a CPU (central processing unit), for example. The storage unit 41 may be caused to function as the second storage unit of the invention.

The control unit 40 sends a control signal to the reception circuit 30 and controls the reception operation of the GPS device 70. The control unit 40 also controls operation of the regulator 34 and regulator 35. More specifically, the control unit 40 functions as part of the satellite signal reception device according to the invention.

The control unit 40 also controls driving the hands 12 through the drive circuit 44. The control unit 40 also controls driving the display 13 through the LCD drive circuit 45. For example, in the positioning information acquisition mode the control unit 40 controls the display 13 to display the current position. The control unit 40 thus also functions as part of the timekeeping device according to the invention.

The internal time information is stored in the storage unit 41. The internal time information is information about the time kept internally by the GPS wristwatch 1. The control unit 40 thus also functions as the timekeeping unit in the invention. This internal time information is updated by the reference clock signal generated by the crystal oscillator 43 and oscillation circuit 42. The internal time information can therefore be updated and moving the hands 12 can continue even when power supply to the reception circuit 30 has stopped.

When the time information acquisition mode is set, the control unit 40 controls operation of the GPS device 70, corrects the internal time information based on the GPS time information and saves the corrected time in the storage unit 41. More specifically, the internal time information is adjusted to the UTC (Coordinated Universal Time), which is acquired by adding the UTC offset (the current time+14 seconds) to the acquired GPS time information.

When the positioning information acquisition mode is set, the control unit 40 controls operation of the GPS device 70, corrects the internal time information based on the satellite time data (GPS time information) and the time difference data, and stores the corrected time in the storage unit 41. The control unit 40 thus functions as a time adjustment unit in a preferred embodiment of the invention.

The positioning information generating process (positioning information acquisition mode) in this first embodiment of the invention is described next.

Note that the control unit 40 and baseband unit 60 can be rendered as dedicated circuits for controlling these processes, or control these processes by executing a control program stored in the storage unit 41 and SRAM 63, for example.

Figure 5:
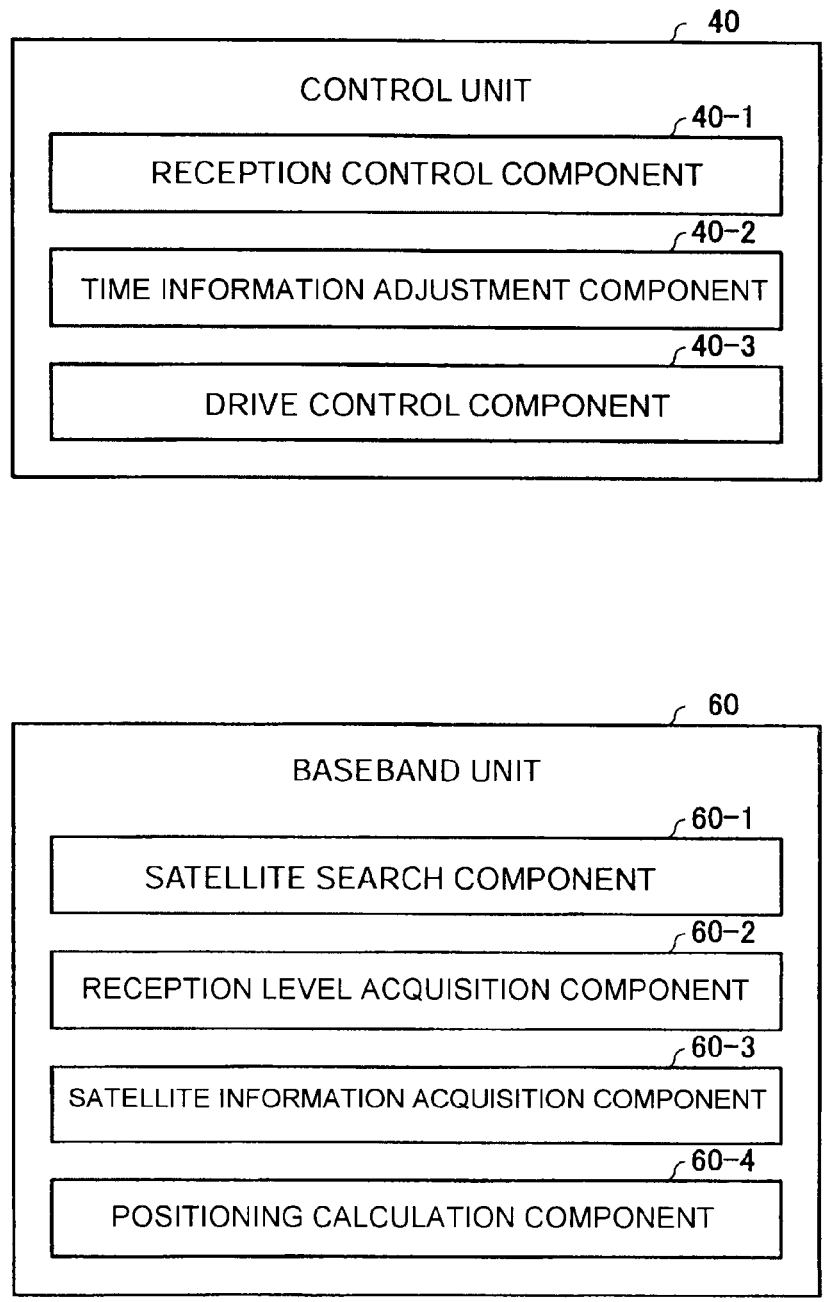
FIG. 5 describes the configuration of the control unit in a preferred embodiment of the invention.
Figure 6:
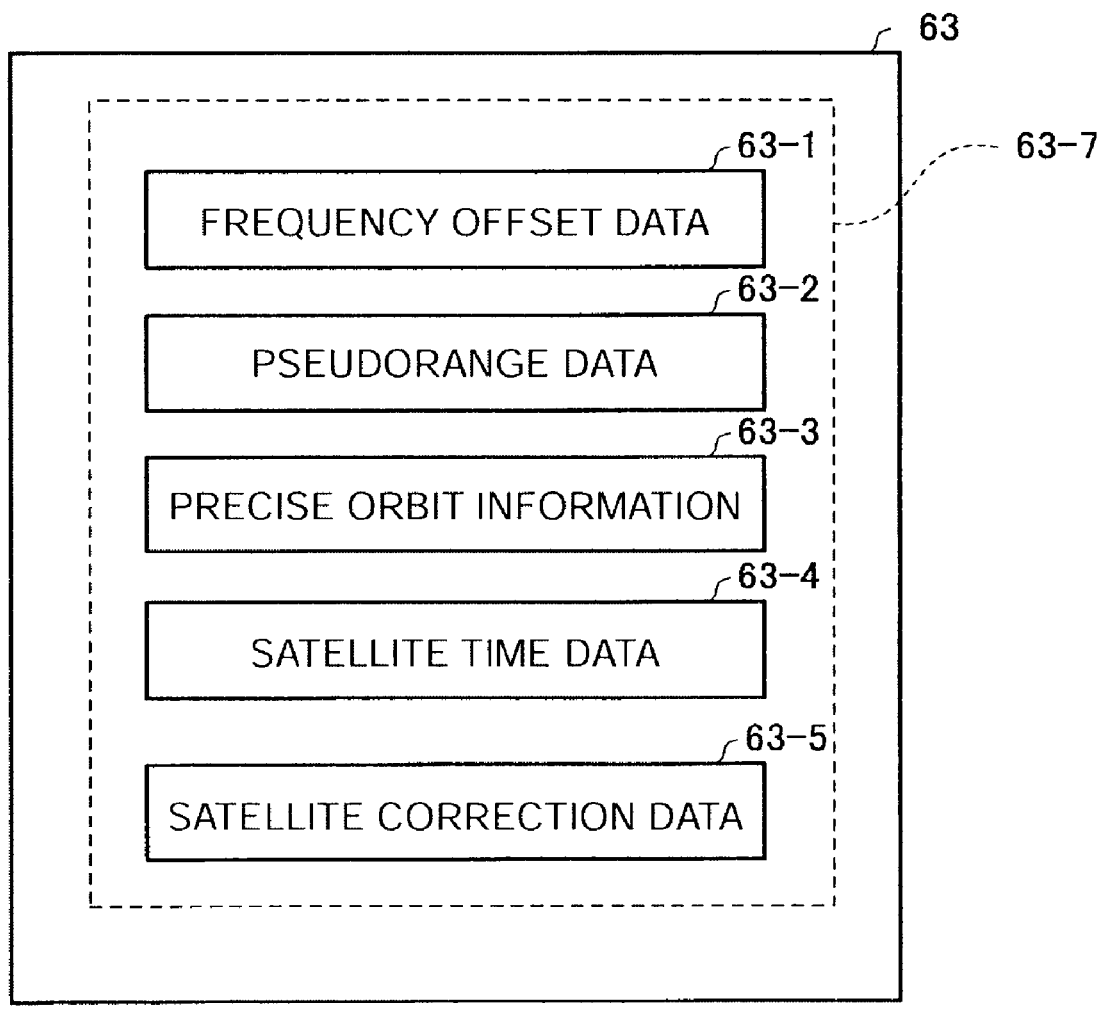
FIG. 6 describes the configuration of the first storage unit in the first embodiment of the invention.

More specifically, as shown in FIG. 5, the positioning information generating process (positioning information acquisition mode) can be executed by the control unit 40 functioning as a reception control component 40-1, time information adjustment component 40-2, and drive control component 40-3, and the baseband unit 60 functioning as a satellite search component 60-1, reception level acquisition component 60-2, satellite information acquisition component 60-3, and positioning calculation component 60-4.

Note that this embodiment of the invention is described below using the SRAM 63 as the first storage unit. The results of various operations are stored in SRAM 63, including the frequency offset data 63-1, the pseudorange data 63-2, the precise orbit information (ephemera parameters) 63-3, the satellite time data (GPS time information) 63-4, and the satellite correction data 63-5 for the received positioning information satellite (GPS satellite 10).

Positioning Information Generating Process

Figure 7:
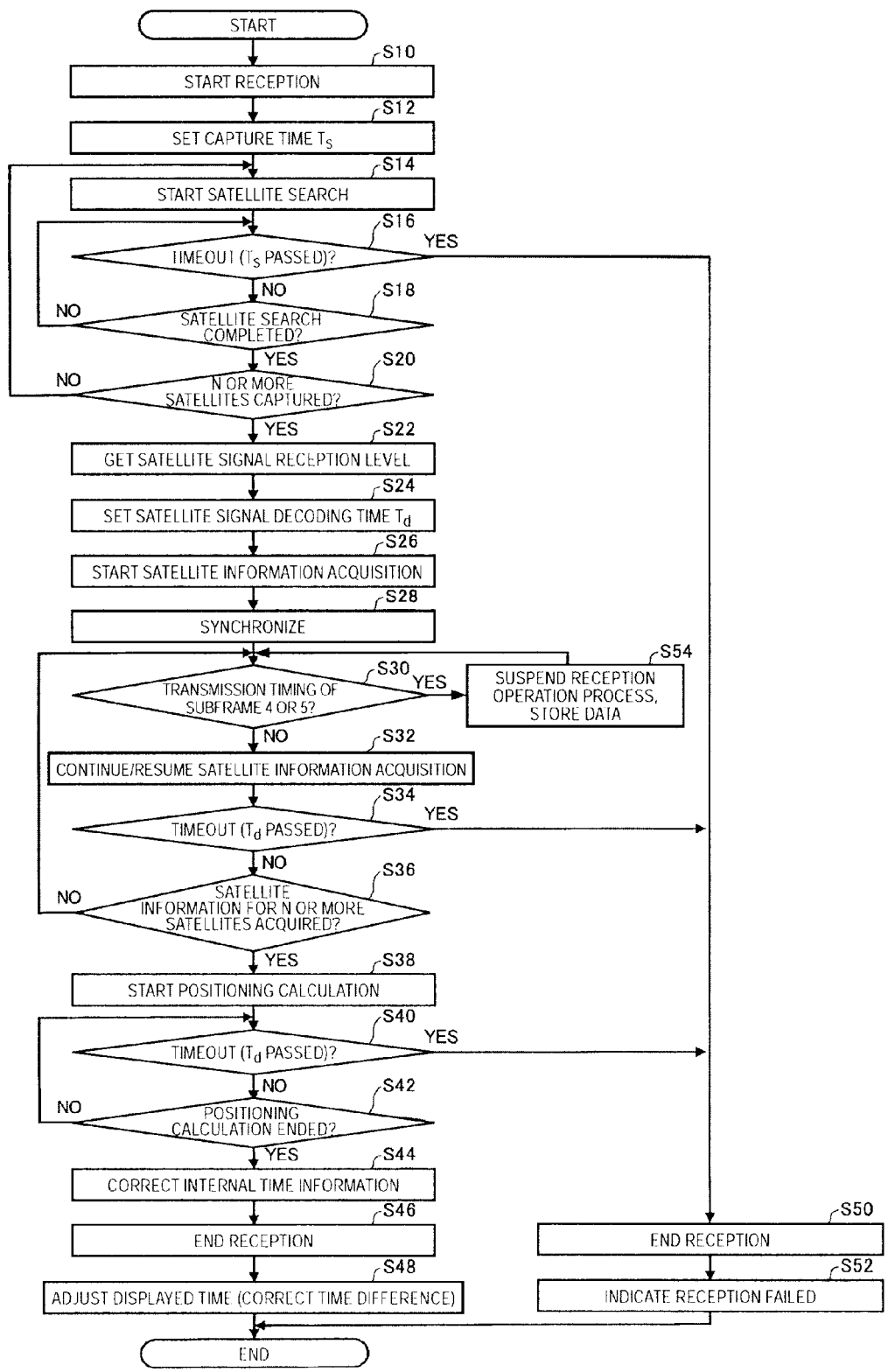
FIG. 7 is a flow chart describing an example of a positioning information generating process (positioning information acquisition mode) in a GPS wristwatch according to the first embodiment of the invention.

FIG. 7 is a flow chart showing an example of a positioning information generating process (positioning information acquisition mode) in a GPS wristwatch according to a first embodiment of the invention. In this first embodiment of the invention the almanac parameter period (that is, the periods when subframes 4 and 5 of the navigation message are transmitted when the positioning information satellite is a GPS satellite) is used as a suspended reception period, that is, a period in which reception is suspended.

When the positioning information acquisition mode is set, the GPS wristwatch 1 executes the positioning information generating process (positioning information acquisition mode) shown in FIG. 7.

When the positioning information generating process (positioning information acquisition mode) starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S10).

When reception starts, the baseband unit 60 sets a capture time $T_s$ (step S12). This capture time $T_s$ is the time limit for completing the satellite search process described below from when the GPS device 70 starts the reception operation. The capture time $T_s$ is set, for example, to 6 seconds. Note that the capture time $T_s$ may be set before reception starts.

The baseband unit 60 (satellite search component 60-1) then starts the satellite search process (satellite search step) (step S14). In the satellite search step the GPS device 70 executes a process of searching for a GPS satellite 10 that can be captured.

More specifically, if there are, for example, thirty GPS satellites 10, the baseband unit 60 (satellite search component 60-1) sequentially generates a local code with the same C/A code as the satellite number SV while changing the satellite number SV from 1 to 30. The baseband unit 60 (satellite search component 60-1) then calculates the correlation between the local code and the C/A code contained the baseband signal. If the C/A code contained in the baseband signal and the local code are the same, the correlation value will peak at a specific time, but if they are different codes, the correlation value will not have a peak and will always be substantially 0.

The baseband unit 60 (satellite search component 60-1) adjusts the output timing of the local code so that the correlation value of the local code and the C/A code in the baseband signal goes to the peak, and determines that the GPS satellite 10 of the satellite number SV was captured if the correlation value is greater than or equal to the set threshold value. The baseband unit 60 (satellite search component 60-1) then saves the information (such as the satellite number) of the captured GPS satellite 10 in SRAM 63, for example.

A frequency shift caused by the Doppler effect occurs in the satellite signal (RF signal) transmitted from each GPS satellite 10 as each captured GPS satellite 10 moves. The baseband unit 60 (satellite search component 60-1) stores the frequency shift of the captured GPS satellite 10 in SRAM 63 or other storage unit as frequency offset data.

The baseband unit 60 (satellite search component 60-1) then determines if the satellite search process was completed before the capture time $T_s$ passed (step S18). For example, when the baseband unit 60 (satellite search component 60-1) searches for capturable GPS satellites 10 while changing the satellite number SV from 1 to 30, whether the satellite search process ended can be determined by determining if searching for the GPS satellite 10 selected as satellite number SV 30 ended.

If the capture time $T_s$ passes before the baseband unit 60 (satellite search component 60-1) completes the satellite search process (step S16 returns Yes), the reception operation of the GPS device 70 is unconditionally aborted (step S50). If the GPS wristwatch 1 is located in an environment where reception is not possible, such as certain indoor locations, the possibility of being able to capture a GPS satellite 10 is extremely low even after searching for all GPS satellites 10 in the constellation. By unconditionally terminating the GPS satellite 10 search when the capture time $T_s$ passes without detecting a GPS satellite 10 that can be captured, the GPS wristwatch 1 can reduce wasteful power consumption.

However, if the satellite search step ends before the capture time $T_s$ passes (step S18 returns Yes), the baseband unit 60 (satellite search component 60-1) determines if at least a specific number (N) of GPS satellites 10 was captured or not (step S20).

It should be noted that the positioning calculation assumes there is a certain amount of error in the internal time kept by the GPS wristwatch 1. More specifically, in order to determine the three-dimensional position (x, y, z) of the GPS wristwatch 1, four unknown values are needed, that is, the values of x, y, and z, and the time difference between the internal time information of the GPS wristwatch 1 and the GPS time information. This means that in order to calculate the three-dimensional location (x, y, z) of the GPS wristwatch 1, GPS time information and precise orbit information (ephemera) is required for four or more GPS satellites 10.

Note that if the altitude parameter z of the three-dimensional coordinates is preset to a fixed value, the positioning precision will be slightly degraded but the position can be calculated using satellite time data (GPS time information) and detailed orbit information (ephemera) from three GPS satellites 10. In this situation N equals 3.

If N (where N=4, for example) or more GPS satellites 10 could not be captured (step S20 returns No), the baseband unit 60 (satellite search component 60-1) restarts the satellite search step (step S14).

However, if N (where N=4, for example) or more GPS satellites 10 were captured (step S20 returns Yes), the baseband unit 60 (reception level acquisition component 60-2) detects the reception levels of the satellite signals sent from each of the captured GPS satellites 10 (step S22). More specifically, the baseband unit 60 (reception level acquisition component 60-2) calculates the signal power of a signal mixing the C/A code of each captured GPS satellite 10 with the local code of the same pattern and a baseband signal to acquire the reception level. The baseband unit 60 (reception level acquisition component 60-2) then saves the reception level of the satellite signal sent from each captured GPS satellite 10 to SRAM 63 or other storage unit.

The baseband unit 60 then sets the satellite signal decoding time $T_d$ (step S24).

The baseband unit 60 (satellite information acquisition component 60-3) then starts acquiring the satellite information (particularly the satellite time data (GPS time information) and precise orbit information (ephemeris parameters)) from the captured GPS satellites 10 (step S26). More specifically, the baseband unit 60 (satellite information acquisition component 60-3) starts a process of demodulating the navigation messages from each captured GPS satellite and acquiring the satellite information.

The baseband unit 60 then synchronizes with the satellite signal (step S28). The baseband unit 60 can synchronize with the satellite signal by, for example, acquiring the TLM word in a subframe. After thus locking onto the satellite signal, the baseband unit 60 (satellite information acquisition component 60-3) demodulates the navigation message from each captured GPS satellite 10, and acquires and sends the Z count data as the satellite time data (GPS time information) to the control unit 40.

Note that if the internal time information kept by the control unit 40 that functions as a timekeeping unit is sufficiently accurate, steps S30 and later can be executed based on the internal time information without synchronizing with the satellite signal (that is, omitting step S28).

The control unit 40 then determines if it is the transmission timing of subframe 4 or subframe 5 (that is, the coarse orbit information period in the invention) based on the satellite time data (GPS time information) sent from the baseband unit 60 (step S30). The transmission timing of each subframe is determined based on the timing of the start of each subframe.

If it is not the transmission timing of subframe 4 or subframe 5 (step S30 returns No), the GPS device 70 continues the reception operation process (resumes the reception operation process if the reception operation process is currently suspended) and executes the process of acquiring the Z count data and ephemeris parameters (step S32). The baseband unit 60 (satellite information acquisition component 60-3) then stores the acquired satellite time data (GPS time information) and precise orbit information (ephemeris parameters) in SRAM 63, for example.

If it is the transmission timing of subframe 4 or subframe 5 (step S30 returns Yes), the GPS device 70 pauses at least a part of the reception operation process (step S54).

More specifically, for example, the control unit 40 may stop at least a part of the reception process included in the reception operation process by controlling the regulator 35 to stop the power supply to the RF unit 50. This enables continuing the positioning information generating process while reducing the current consumption of the satellite signal reception device. Because operation of the baseband unit 60 continues in this situation, the entire reception operation process can be resumed in a short time after the reception process of the RF unit 50 resumes.

Note that if the GPS wristwatch 1 uses a regulator 35-1 instead of this regulator 35 to supply drive power to the RF unit 50, the control unit 40 may stop at least a part of the reception process included in the reception operation process by controlling the regulator 35-1 to stop the power supply to the RF unit 50.

The control unit 40 can also stop at least a part of the reception process and positioning information generating process included in the reception operation process by controlling the regulator 35 to stop the power supply to the RF unit 50 and baseband unit 60. This enables further reducing the current consumption of the satellite signal reception device.

The data required for the reception operation process 63-7 can also be stored (or held if already stored) in SRAM 63, for example, while at least part of the reception operation process is suspended (the suspended reception period in the invention). More specifically, SRAM 63 functions as a first storage unit in this embodiment of the invention. The reception operation process can thus be quickly resumed because the data required for the reception operation process 63-7 can be retained even during the suspended reception period.

The data required for the reception operation process 63-7 in this embodiment of the invention includes at least one of the following for the received positioning information satellite (GPS satellite 10), that is, the frequency offset data 63-1, the pseudorange data 63-2, the precise orbit information (ephemeris parameters) 63-3, the satellite time data (GPS time information) 63-4, and the satellite correction data 63-5.

If the satellite signal decoding time $T_d$ passes before the baseband unit 60 (satellite information acquisition component 60-3) acquires satellite information from N (such as 4) or more GPS satellites 10 (step S34 returns Yes), the reception operation of the GPS device 70 ends unconditionally (step S50). The satellite signal decoding time $T_d$ may pass without being able to correctly demodulate the satellite information for N (such as 4) or more GPS satellites 10 because the reception level of the satellite signal from the GPS satellite 10 is low, for example.

If satellite information is acquired from N (such as 4) or more GPS satellites 10 before the satellite signal decoding time $T_d$ passes (step S36 returns Yes), the baseband unit 60 (positioning calculation component 60-4) selects a group of N (such as 4) GPS satellites 10 from among the captured GPS satellites 10, and starts the positioning calculation (step S38).

More specifically, the baseband unit 60 (positioning calculation component 60-4) reads the satellite information (satellite time data (GPS time information) and precise orbit information (ephemeris parameters) for the selected N (such as 4) GPS satellites 10 from SRAM 63 and runs the positioning calculation to generate positioning information (the longitude and latitude (coordinates) of the location where the GPS wristwatch 1 is positioned).

As described above, the GPS time information denotes the time when the GPS satellite 10 transmitted the first bit in a subframe of the navigation message. The baseband unit 60 (positioning calculation component 60-4) can therefore calculate the pseudorange between each of the N (such as 4) GPS satellites 10 and the GPS wristwatch 1 based on the time correction data and the difference between the GPS time and the internal time when the first bit of the subframe was received. The baseband unit 60 (positioning calculation component 60-4) can also calculate the positions of each of the N (such as 4) GPS satellites 10 based on the precise orbit information (ephemeris parameters). The baseband unit 60 (positioning calculation component 60-4) can then calculate the position of the GPS wristwatch 1 based on the pseudoranges between the GPS wristwatch 1 and the N (such as 4) GPS satellites 10 and the positions of the N (such as 4) GPS satellites 10.

The baseband unit 60 (positioning calculation component 60-4) then references the time difference information stored in flash memory 66, and acquires the time difference data related to the coordinates (longitude and latitude) of the GPS wristwatch 1 identified from the positioning information.

The baseband unit 60 (positioning calculation component 60-4) thus ends the positioning calculation if the satellite time data (GPS time information) and time difference data can be generated as the time adjustment information.

If the satellite signal decoding time $T_d$ passes before the baseband unit 60 (positioning calculation component 60-4) completes the positioning calculation (step S40 returns Yes), the reception operation of the GPS device 70 ends unconditionally (step S50). For example, the satellite signal decoding time $T_d$ may pass before the one time difference datum linked to the coordinates (such as the longitude and latitude) of the GPS wristwatch 1 can be identified.

However, if the positioning calculation can be completed before the satellite signal decoding time $T_d$ passes (step S42 returns Yes), the control unit 40 (time information adjustment component 40-2) corrects the internal time information stored in the storage unit 41 using the time adjustment information (step S44).

The reception operation of the GPS device 70 then ends (step S46).

Finally, the control unit 40 (drive control component 40-3) controls the drive circuit 44 or LCD drive circuit 45 based on the corrected internal time information to adjust the displayed time (step S48).

Note that if the reception operation of the GPS device 70 ends unconditionally (step S50), the control unit 40 (drive control component 40-3) controls the drive circuit 44 or LCD drive circuit 45 to display an indication that reception failed (step S52).

Figure 8:
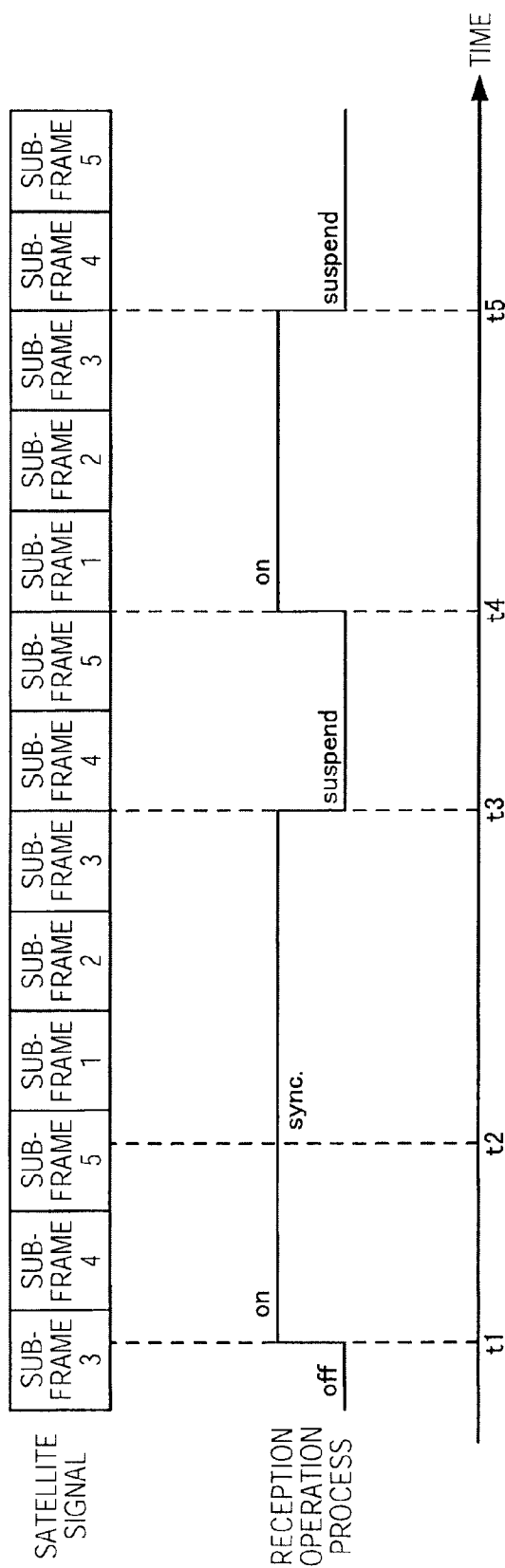
FIG. 8 is a timing chart describing the operation of the reception operation process of the reception operation unit included in the GPS device according to the first embodiment of the invention.

FIG. 8 is a timing chart describing execution of the reception operation process of the reception operation unit contained in the GPS device 70 according to the first embodiment of the invention.

It is assumed below that the reception operation unit starts the reception operation process (step S10) at time t1. In FIG. 8 time t1 is in subframe 3.

The reception operation unit then synchronizes with the satellite signal (step S28) at time t2 a certain time after time t1. In FIG. 8 time t2 is in subframe 5.

Because the transmission timing of subframe 4 or subframe 5 (as determined by the timing of the beginning of subframe 4 or subframe 5 in this embodiment of the invention) does not arrive until time t3 after synchronizing with the satellite signal (step S30 returns No), the reception operation unit continues the reception operation process.

Because the transmission timing of subframe 4 then comes at time t3 (step S30 returns Yes), the reception operation unit pauses at least a part of the reception operation process (step S54).

Because the transmission timing of subframe 1 then comes at time t4 (step S30 returns No), the reception operation unit resumes the reception operation process.

Because the transmission timing of subframe 4 then comes at time t5 (step S30 returns Yes), the reception operation unit pauses at least a part of the reception operation process (step S54).

The reception operation unit thereafter repeats suspending and resuming the reception operation process until correcting the internal time information ends (step S46) or a time-out occurs during the reception operation process (step S50).

This first embodiment of the invention thus acquires the precise orbit information (ephemeris parameters) required to generate the positioning information, and pauses at least a part of the reception operation process during the periods when the coarse orbit information (almanac parameters) that is not needed to generate the positioning information is being transmitted. As a result, because operation can be reduced for the period of two (subframes 4 and 5) of the five subframes in the navigation message, the reception operation can be reduced to a minimum of 18 seconds/30 seconds=60%. The current consumption of a satellite signal reception device and a timekeeping device including a satellite signal reception device can therefore be reduced.

2-2 Embodiment 2

The structure and circuit configuration of a GPS wristwatch according to this second embodiment of the invention are the same as the structure and circuit configuration of the GPS wristwatch according to the first embodiment of the invention shown in FIG. 3 to FIG. 6, and further description thereof is thus omitted.

Positioning Information Generating Process

Figure 9:
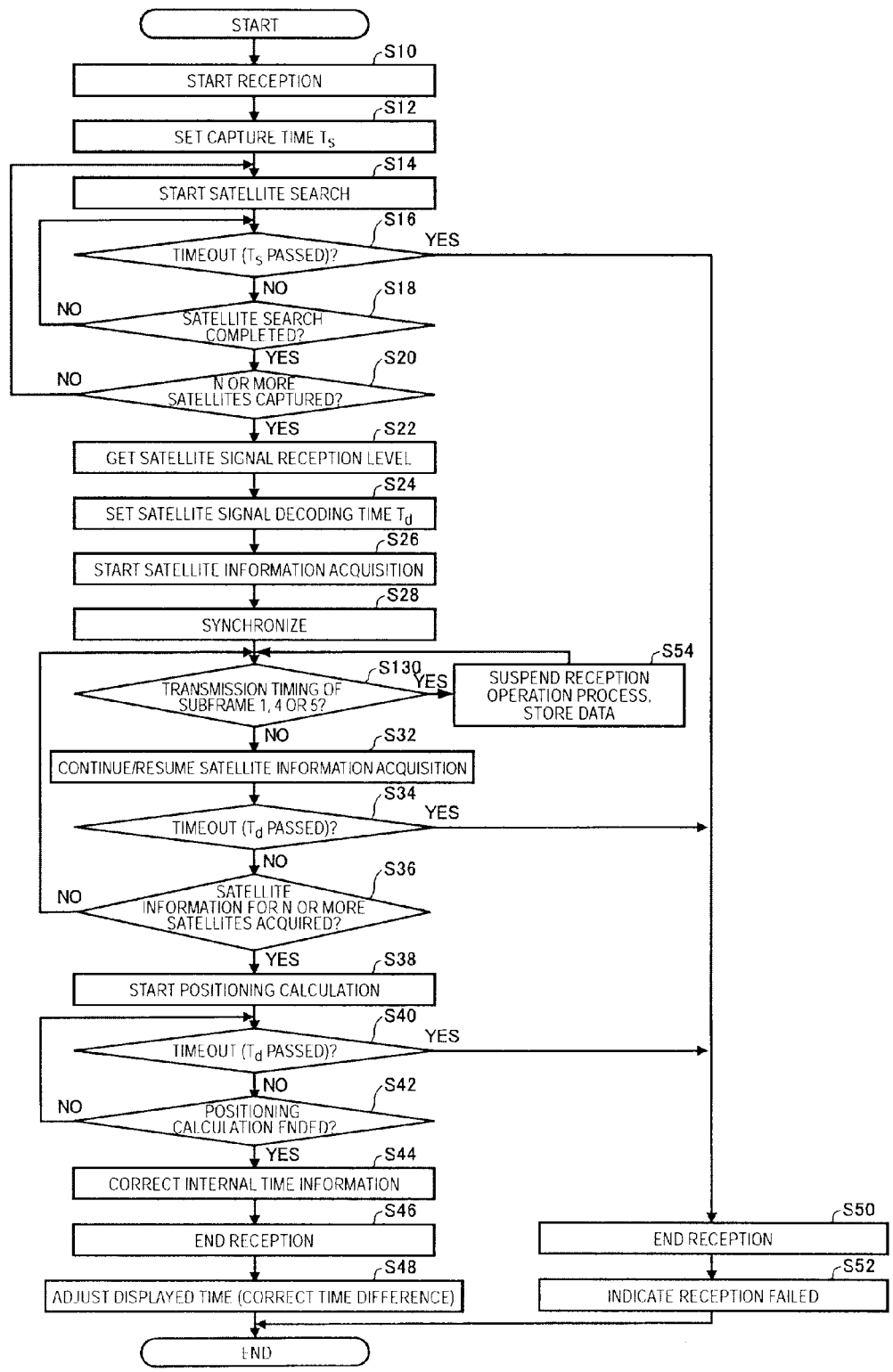
FIG. 9 is a flow chart describing an example of a positioning information generating process (positioning information acquisition mode) in a GPS wristwatch according to a second embodiment of the invention.

FIG. 9 is a flow chart showing an example of a positioning information generating process (positioning information acquisition mode) in a GPS wristwatch according to a second embodiment of the invention. In this second embodiment of the invention the satellite correction information period and the almanac parameter period (that is, the periods when subframes 1, 4 and 5 of the navigation message are transmitted when the positioning information satellite is a GPS satellite) are used as suspended reception periods, that is, periods in which reception is suspended. Note that identical steps in this embodiment and the first embodiment described above are identified by identical reference numerals in the flow chart shown in FIG. 7, and further detailed description thereof is omitted.

When the time difference adjustment process (positioning information acquisition mode) starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S10). Operation is thereafter the same as described in the first embodiment until the baseband unit 60 synchronizes with the satellite signal (step S28).

Note that if the internal time information kept by the control unit 40 that functions as a timekeeping unit is sufficiently accurate, steps S30 and later can be executed based on the internal time information without synchronizing with the satellite signal (that is, omitting step S28).

The control unit 40 then determines if it is the transmission timing of subframe 1, 4 or 5 (that is, the satellite correction information period and the coarse orbit information period in the invention) based on the satellite time data (GPS time information) sent from the baseband unit 60 (step S130). The transmission timing of each subframe is determined based on the timing of the start of each subframe.

If it is not the transmission timing of subframe 1, 4 or 5 (step S130 returns No), the GPS device 70 continues the reception operation process (resumes the reception operation process if the reception operation process is currently suspended) and executes the process of acquiring the Z count data and ephemeris parameters (step S32). The baseband unit 60 (satellite information acquisition component 60-3) then stores the acquired satellite time data (GPS time information) and precise orbit information (ephemeris parameters) in SRAM 63, for example.

If it is the transmission timing of subframe 1, 4 or 5 (step S130 returns Yes), the GPS device 70 pauses at least a part of the reception operation process (step S54). The actual operation of step S54 is the same as described in the first embodiment.

Operation thereafter from acquiring satellite information to correcting the displayed time by means of the baseband unit 60 (satellite information acquisition component 60-3) (from step S34 to step S48), and displaying a reception failure in the case of a time-out (to step S52), is the same as in the first embodiment.

Figure 10:
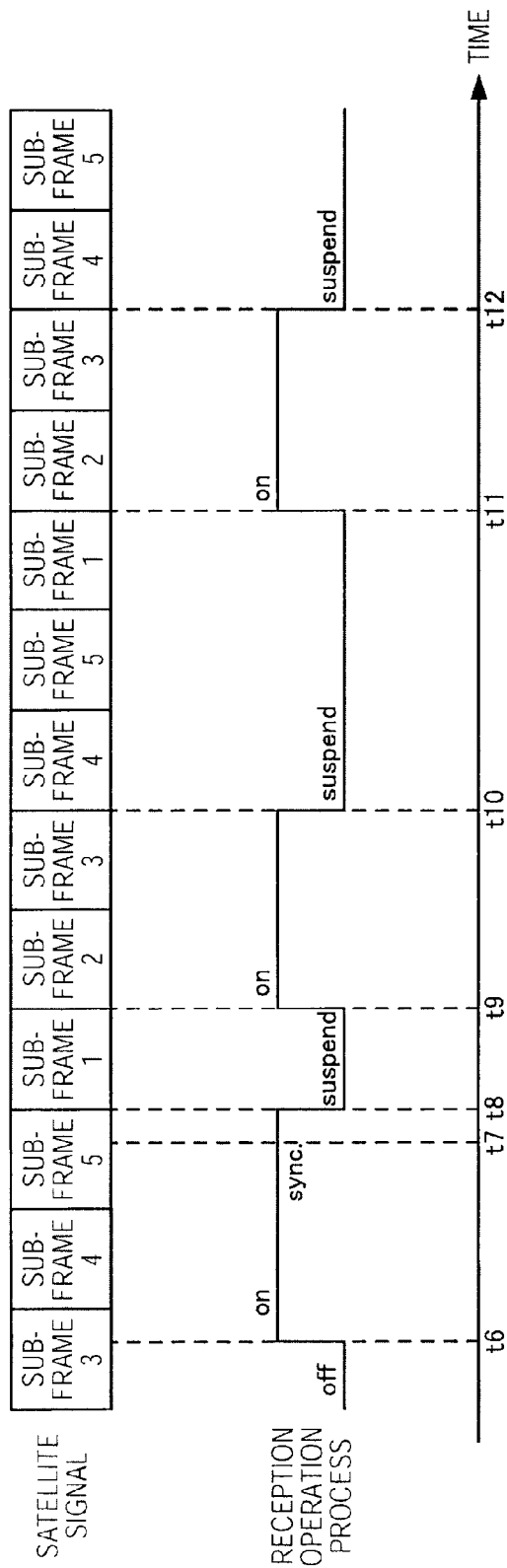
FIG. 10 is a timing chart describing the operation of the reception operation process of the reception operation unit included in the GPS device 70 according to the second embodiment of the invention.

FIG. 10 is a timing chart describing execution of the reception operation process of the reception operation unit contained in the GPS device 70 according to the second embodiment of the invention.

It is assumed below that the reception operation unit starts the reception operation process (step S10) at time t6. In FIG. 10 time t6 is in subframe 3.

The reception operation unit then synchronizes with the satellite signal (step S28) at time t7 a certain time after time t7. In FIG. 10 time t7 is in subframe 5.

Because the transmission timing of subframe 1, 4 or 5 (as determined by the timing of the beginning of subframe 1, 4 or 5 in this embodiment of the invention) does not arrive until time t8 after synchronizing with the satellite signal (step S130 returns No), the reception operation unit continues the reception operation process.

Because the transmission timing of subframe 1 then comes at time t8 (step S130 returns Yes), the reception operation unit pauses at least a part of the reception operation process (step S54).

Because the transmission timing of subframe 2 then comes at time t9 (step S130 returns No), the reception operation unit resumes the reception operation process.

Because the transmission timing of subframe 4 then comes at time t10 (step S130 returns Yes), the reception operation unit pauses at least a part of the reception operation process (step S54).

Because the transmission timing of subframe 2 then comes at time t11 (step S130 returns No), the reception operation unit resumes the reception operation process.

Because the transmission timing of subframe 4 then comes at time t12 (step S130 returns Yes), the reception operation unit pauses at least a part of the reception operation process (step S54).

The reception operation unit thereafter repeats suspending and resuming the reception operation process until correcting the internal time information ends (step S46) or a time-out occurs during the reception operation process (step S50).

This second embodiment of the invention thus acquires the precise orbit information (ephemeris parameters) required to generate the positioning information, and pauses at least a part of the reception operation process during the periods when the coarse orbit information (almanac parameters) and satellite correction data that is not needed to generate the positioning information is being transmitted. As a result, because operation can be reduced for the period of three (subframes 1, 4 and 5) of the five subframes in the navigation message, the reception operation can be reduced to a minimum of 12 seconds/30 seconds=40%. The current consumption of a satellite signal reception device and a timekeeping device including a satellite signal reception device can therefore be reduced.

The second embodiment of the invention is particularly useful when the satellite signal reception device stores the previously acquired satellite correction data, the possibility of capturing the same positioning information satellite (GPS satellite 10) that was captured the last time the satellite correction data was acquired is high, and the stored satellite correction data can be used (such as when the time passed since acquiring the previous satellite correction data is short).

2-3 Embodiment 3

The structure and circuit configuration of a GPS wristwatch according to this third embodiment of the invention are the same as the structure and circuit configuration of the GPS wristwatch according to the first embodiment of the invention shown in FIG. 3 to FIG. 6, and further description thereof is thus omitted.

Positioning Information Generating Process

Figure 11:
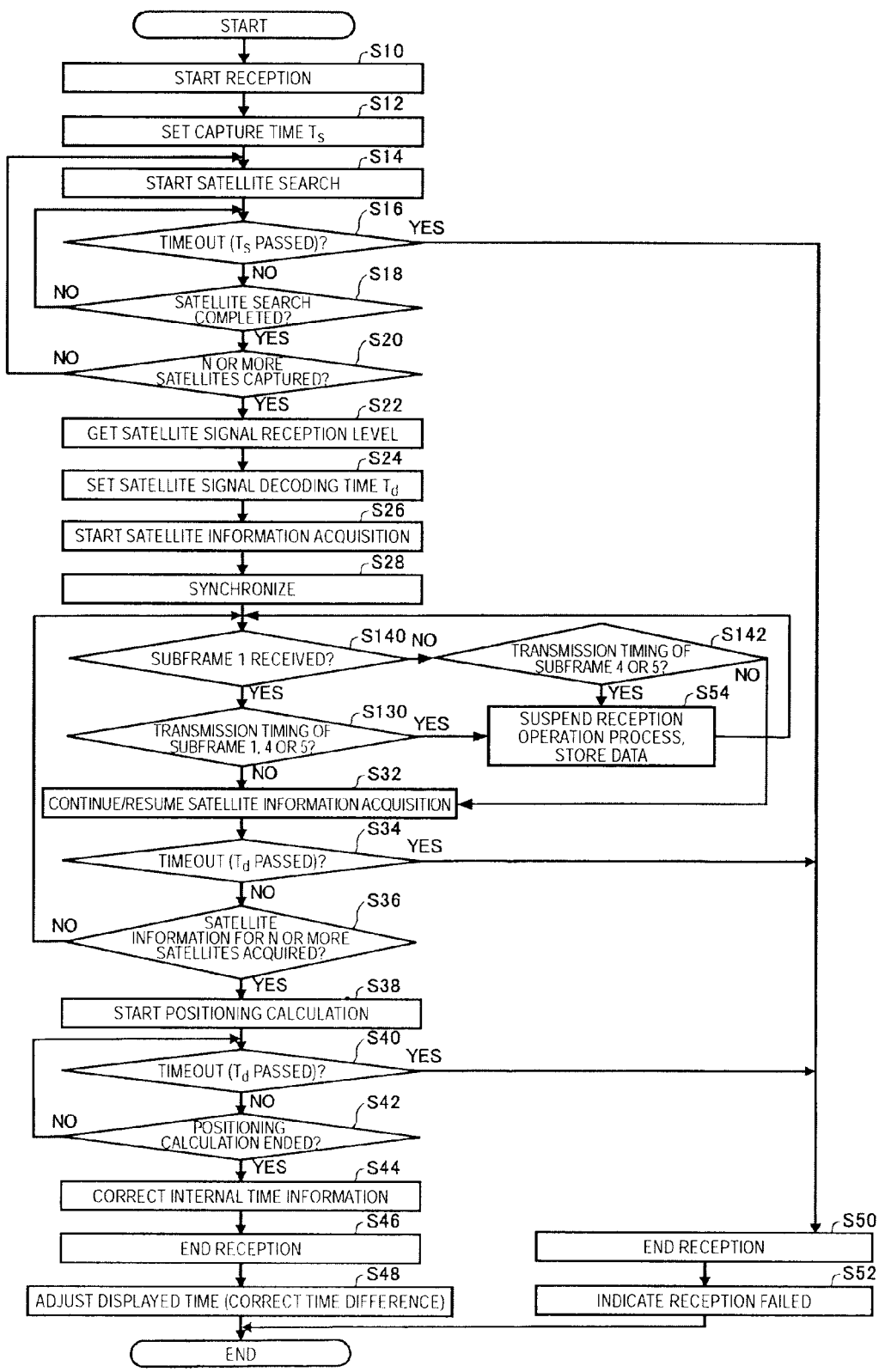
FIG. 11 is a flow chart describing an example of a positioning information generating process (positioning information acquisition mode) in a GPS wristwatch according to a third embodiment of the invention.

FIG. 11 is a flow chart showing an example of a positioning information generating process (positioning information acquisition mode) in a GPS wristwatch according to a third embodiment of the invention.

In this third embodiment of the invention the satellite correction information period and the almanac parameter period (that is, the periods when subframes 1, 4 and 5 of the navigation message are transmitted when the positioning information satellite is a GPS satellite) are used as suspended reception periods during the time until the reception operation process is completed after the first satellite correction data (subframe 1 of the navigation message when the positioning information satellite is a GPS satellite) is acquired after the reception operation process starts. Note that identical steps in this embodiment and the first and second embodiments described above are identified by identical reference numerals in the flow charts shown in FIG. 7 and FIG. 9, and further detailed description thereof is omitted.

When the time difference adjustment process (positioning information acquisition mode) starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S10). Operation is thereafter the same as described in the first embodiment until the baseband unit 60 synchronizes with the satellite signal (step S28).

Note that if the internal time information kept by the control unit 40 that functions as a timekeeping unit is sufficiently accurate, steps S30 and later can be executed based on the internal time information without synchronizing with the satellite signal (that is, omitting step S28).

The control unit 40 then determines if subframe 1 has been acquired (step S140). If subframe 1 has not been acquired (step S140 returns No), the control unit 40 then determines if it is the transmission timing of subframe 4 or 5 (that is, the coarse orbit information period in the invention) based on the satellite time data (GPS time information) sent from the baseband unit 60 (step S142). The transmission timing of each subframe is determined based on the timing of the start of each subframe.

If it is not the transmission timing of subframe 4 or 5 (step S142 returns No), the GPS device 70 continues the reception operation process (resumes the reception operation process if the reception operation process is currently suspended) and executes the process of acquiring the Z count data and ephemeris parameters (step S32). The baseband unit 60 (satellite information acquisition component 60-3) then stores the acquired satellite time data (GPS time information) and precise orbit information (ephemeris parameters) in SRAM 63, for example.

If it is the transmission timing of subframe 4 or 5 (step S142 returns Yes), the GPS device 70 suspends at least a part of the reception operation process (step S54). The actual operation of step S54 is the same as described in the first embodiment.

If subframe 1 has already been acquired (step S140 returns Yes), the control unit 40 determines if it is the transmission timing for subframe 1, 4, or 5 (the satellite correction information period and the coarse orbit information period in the invention) based on the satellite time data (GPS time information) sent from the baseband unit 60 (step S130). The transmission timing of each subframe is determined based on the timing of the start of each subframe.

If it is not the transmission timing of subframe 1, 4 or 5 (step S130 returns No), the GPS device 70 continues the reception operation process (resumes the reception operation process if the reception operation process is currently suspended) and executes the process of acquiring the Z count data and ephemeris parameters (step S32). The baseband unit 60 (satellite information acquisition component 60-3) then stores the acquired satellite time data (GPS time information) and precise orbit information (ephemeris parameters) in SRAM 63, for example.

If it is the transmission timing of subframe 1, 4 or 5 (step S130 returns Yes), the GPS device 70 pauses at least a part of the reception operation process (step S54).

Operation thereafter from acquiring satellite information to correcting the displayed time by means of the baseband unit 60 (satellite information acquisition component 60-3) (from step S34 to step S48), and displaying a reception failure in the case of a time-out (to step S52), is the same as in the first embodiment.

Figure 12:
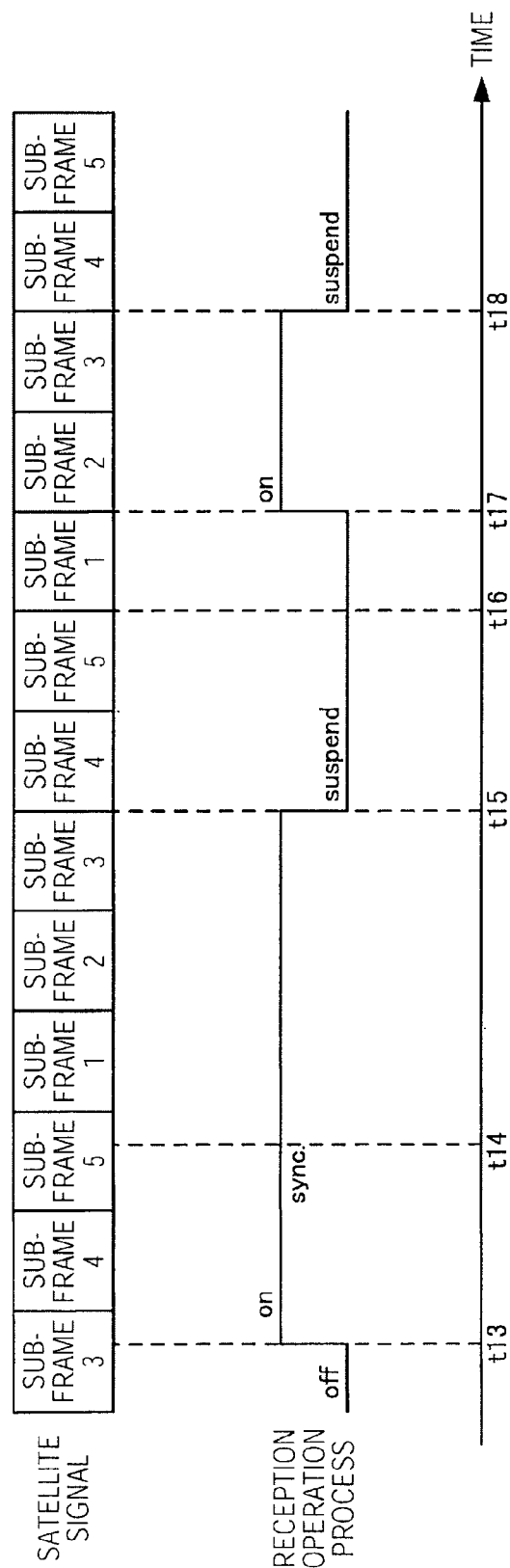
FIG. 12 is a timing chart describing the operation of the reception operation process of the reception operation unit included in the GPS device 70 according to the third embodiment of the invention.

FIG. 12 is a timing chart describing execution of the reception operation process of the reception operation unit contained in the GPS device 70 according to the third embodiment of the invention.

It is assumed below that the reception operation unit starts the reception operation process (step S10) at time t13. In FIG. 12 time t13 is in subframe 3.

The reception operation unit then synchronizes with the satellite signal (step S28) at time t14 a certain time after time t13. In FIG. 12 time t14 is in subframe 5.

Because subframe 1 has not been received at time t14 (step S140 returns No), the reception operation unit continues the reception operation process until the transmission timing of subframe 4 or 5.

Because the transmission timing of subframe 4 or 5 (as determined by the timing of the beginning of subframe 4 or 5 in this embodiment of the invention) does not arrive until time t15 in FIG. 12 after synchronizing with the satellite signal (step S142 returns No), the reception operation unit continues the reception operation process.

Because the transmission timing of subframe 4 then comes at time t15 (step S142 returns Yes), the reception operation unit pauses at least a part of the reception operation process (step S54).

Because at time t16 subframe 1 has been received (step S140 returns Yes), the reception operation unit resumes the reception operation process (step S32) when the transmission timing of a subframe other than subframe 1, 4, or 5 (that is, at the timing of subframe 2 or subframe 3) arrives (step S130 returns Yes). Because the transmission timing of subframe 2 comes after time t15 at time t17 (step S130 returns No) in FIG. 12, the reception operation unit resumes the reception operation process.

Because the transmission timing of subframe 4 then comes at time t18 (step S130 returns Yes), the reception operation unit pauses at least a part of the reception operation process (step S54).

The reception operation unit thereafter repeats suspending and resuming the reception operation process until correcting the internal time information ends (step S46) or a time-out occurs during the reception operation process (step S50).

After acquiring the first satellite correction data in the reception operation process, this third embodiment of the invention acquires the precise orbit information (ephemeris parameters) required to generate the positioning information, and suspends at least a part of the reception operation process during the periods in which the satellite correction data and the coarse orbit information (almanac parameters) that are not needed to generate the positioning information are transmitted.

As a result, because operation can be reduced during three (subframes 1, 4 and 5) of the five subframes in the navigation message, the reception operation can be reduced to a minimum of 12 seconds/30 seconds=40%. The current consumption of a satellite signal reception device and a timekeeping device including a satellite signal reception device can therefore be reduced.

In addition, the position can be calculated more precisely than in the second embodiment because the first satellite correction data is acquired. Yet further, because the positioning calculation can thus converge more quickly, the positioning calculation can be completed in less time than in the second embodiment.

2-4 Embodiment 4

The structure and circuit configuration of a GPS wristwatch according to this fourth embodiment of the invention are the same as the structure and circuit configuration of the GPS wristwatch according to the first embodiment of the invention shown in FIG. 3 to FIG. 6, and further description thereof is thus omitted.

Positioning Information Generating Process

Figure 13:
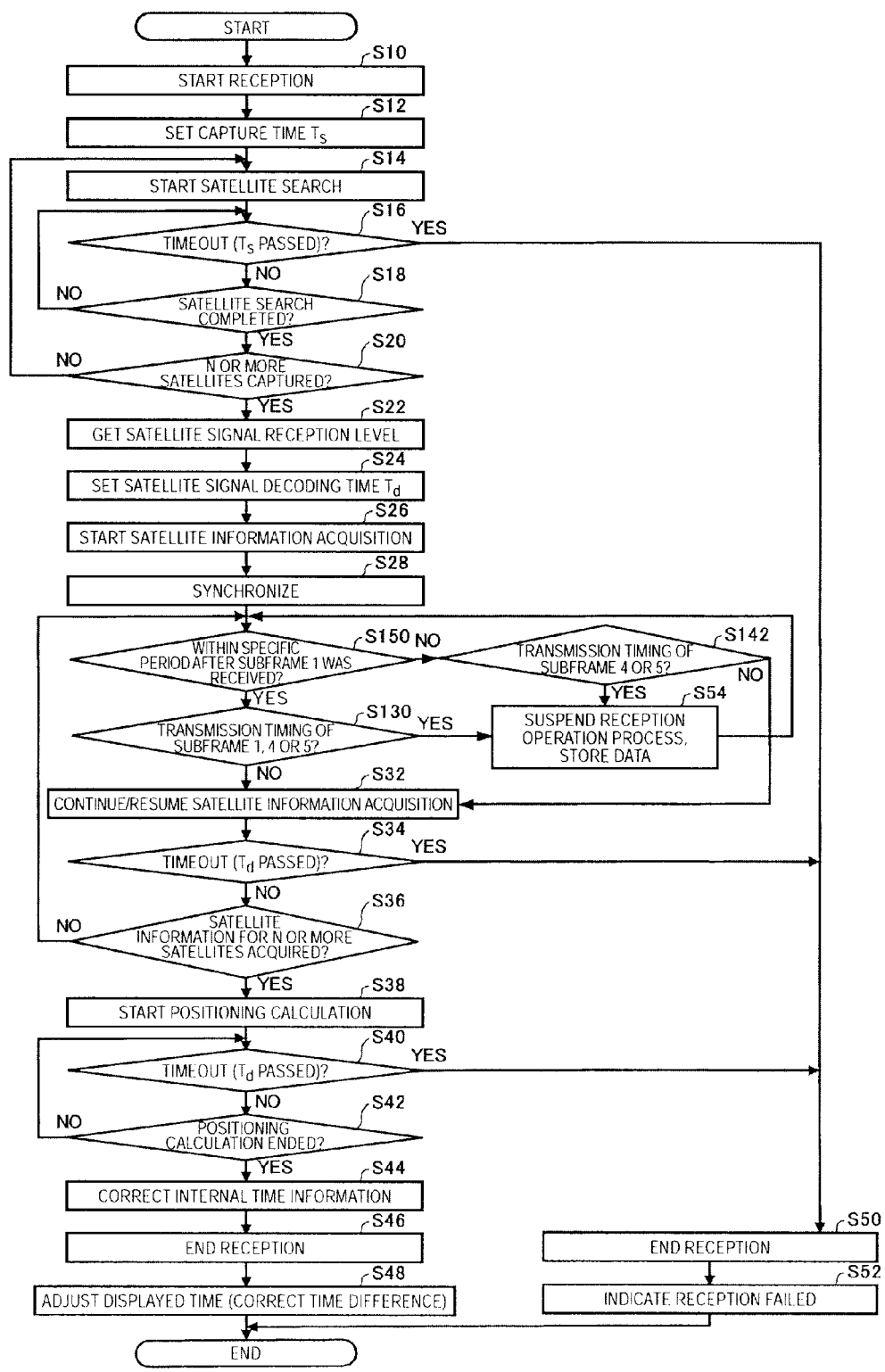
FIG. 13 is a flow chart describing an example of a positioning information generating process (positioning information acquisition mode) in a GPS wristwatch according to a fourth embodiment of the invention.

FIG. 13 is a flow chart showing an example of a positioning information generating process (positioning information acquisition mode) in a GPS wristwatch according to a fourth embodiment of the invention.

In this fourth embodiment of the invention the satellite correction information period and the almanac parameter period (that is, the periods when subframes 1, 4 and 5 of the navigation message are transmitted when the positioning information satellite is a GPS satellite) are used as suspended reception periods for a specific time after the satellite correction data (subframe 1 of the navigation message when the positioning information satellite is a GPS satellite) is acquired after the reception operation process starts. Note that identical steps in this embodiment and the first to third embodiments described above are identified by identical reference numerals in the flow charts shown in FIG. 7, FIG. 9, and FIG. 11, and further detailed description thereof is omitted.

When the time difference adjustment process (positioning information acquisition mode) starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S10). Operation is thereafter the same as described in the first embodiment until the baseband unit 60 synchronizes with the satellite signal (step S28).

Note that if the internal time information kept by the control unit 40 that functions as a timekeeping unit is sufficiently accurate, steps S30 and later can be executed based on the internal time information without synchronizing with the satellite signal (that is, omitting step S28).

The control unit 40 then determines if it is within a specified time after receiving the previous subframe 1 (step S150). This specified time may be a period of several hours, for example. If it is not within the specified time after receiving the previous subframe 1 (step S150 returns No), the control unit 40 determines if it is the transmission timing of subframe 4 or 5 (that is, the coarse orbit information period in the invention) based on the satellite time data (GPS time information) sent from the baseband unit 60 (step S142). The transmission timing of each subframe is determined based on the timing of the start of each subframe.

If it is not the transmission timing of subframe 4 or 5 (step S142 returns No), the GPS device 70 continues the reception operation process (resumes the reception operation process if the reception operation process is currently suspended) and executes the process of acquiring the Z count data and ephemeris parameters (step S32). The baseband unit 60 (satellite information acquisition component 60-3) then stores the acquired satellite time data (GPS time information) and precise orbit information (ephemeris parameters) in SRAM 63, for example.

If it is the transmission timing of subframe 4 or 5 (step S142 returns Yes), the GPS device 70 suspends at least a part of the reception operation process (step S54). The actual operation of step S54 is the same as described in the first embodiment.

If it is within a specified time after receiving the previous subframe 1 (step S150 returns Yes), the control unit 40 determines if it is the transmission timing for subframe 1, 4, or 5 (the satellite correction information period and the coarse orbit information period in the invention) based on the satellite time data (GPS time information) sent from the baseband unit 60 (step S130). The transmission timing of each subframe is determined based on the timing of the start of each subframe.

If it is not the transmission timing of subframe 1, 4 or 5 (step S130 returns No), the GPS device 70 continues the reception operation process (resumes the reception operation process if the reception operation process is currently suspended) and executes the process of acquiring the Z count data and ephemeris parameters (step S32). The baseband unit 60 (satellite information acquisition component 60-3) then stores the acquired satellite time data (GPS time information) and precise orbit information (ephemeris parameters) in SRAM 63, for example.

If it is the transmission timing of subframe 1, 4 or 5 (step S130 returns Yes), the GPS device 70 pauses at least a part of the reception operation process (step S54). The actual operation of step S54 is the same as described in the first embodiment.

Operation thereafter from acquiring satellite information to correcting the displayed time by means of the baseband unit 60 (satellite information acquisition component 60-3) (from step S34 to step S48), and displaying a reception failure in the case of a time-out (to step S52), is the same as in the first embodiment.

Figure 14:
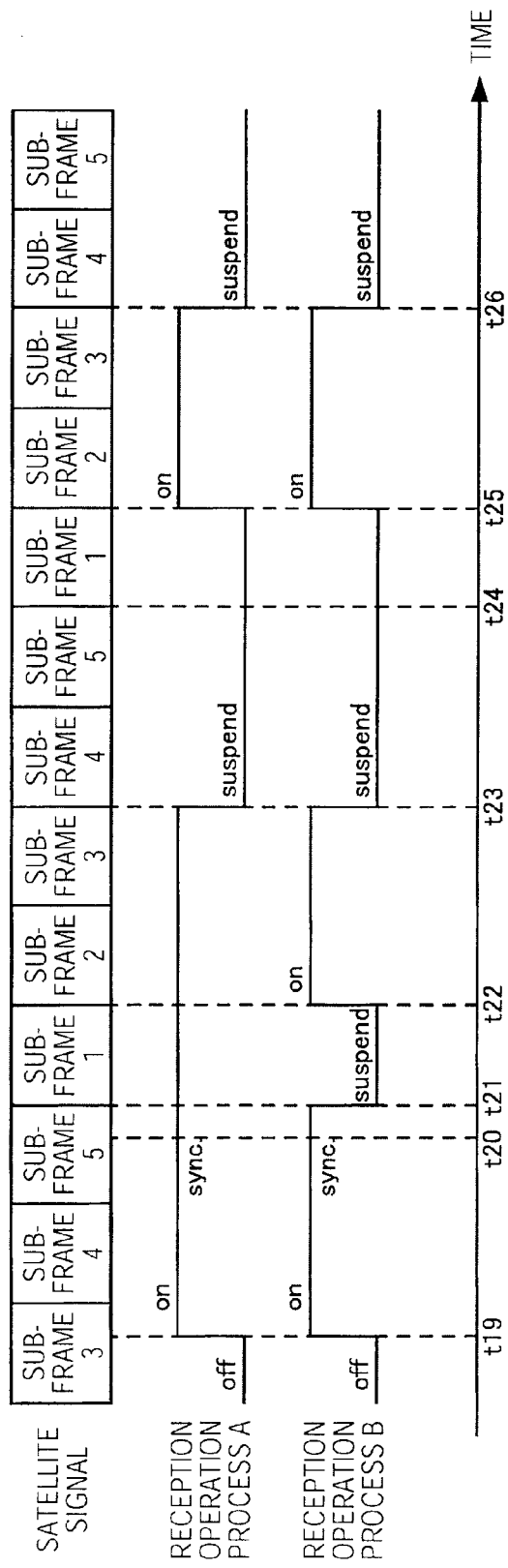
FIG. 14 is a timing chart describing the operation of the reception operation process of the reception operation unit included in the GPS device 70 according to the fourth embodiment of the invention.

FIG. 14 is a timing chart describing execution of the reception operation process of the reception operation unit contained in the GPS device 70 according to the fourth embodiment of the invention.

The operation of the reception operation process when it is not within the specified period after receiving the previous subframe 1 (when step S150 returns No) is referred to below as reception operation process A, and the operation of the reception operation process when it is within the specified period after receiving the previous subframe 1 (when step S150 returns Yes) is referred to below as reception operation process B.

In the reception operation process A, the reception operation unit starts the reception operation process (step S10) at time t19. In FIG. 14 time t19 is in subframe 3.

The reception operation unit then synchronizes with the satellite signal (step S28) at time t20 a certain time after time t19. In FIG. 14 time t20 is in subframe 5.

Because time t20 in reception operation process A is not within the specific time after receiving the previous subframe 1 (step S150 returns No), the reception operation unit continues the reception operation process until the transmission timing of subframe 4 or 5.

Because the transmission timing of subframe 4 or 5 (as determined by the timing of the beginning of subframe 4 or 5 in this embodiment of the invention) does not arrive until time t23 in FIG. 14 after synchronizing with the satellite signal (step S142 returns No), the reception operation unit continues the reception operation process.

Because the transmission timing of subframe 4 then comes at time t23 (step S142 returns Yes), the reception operation unit pauses at least a part of the reception operation process (step S54).

Because time t24 is within the specified time after receiving the previous subframe 1 (step S150 returns Yes), the reception operation unit resumes the reception operation process (step S32) at the transmission timing of a subframe other than subframe 1, 4, or 5 (that is, at the timing of subframe 2 or subframe 3) (step S130 returns Yes). Because the transmission timing of subframe 2 comes after time t23 at time t25 (step S130 returns No) in FIG. 14, the reception operation unit resumes the reception operation process.

Because the transmission timing of subframe 4 then comes at time t26 (step S130 returns Yes), the reception operation unit pauses at least a part of the reception operation process (step S54).

The reception operation unit thereafter repeats suspending and resuming the reception operation process until correcting the internal time information ends (step S46) or a time-out occurs during the reception operation process (step S50).

In the reception operation process B, the reception operation unit starts the reception operation process (step S10) at time t19. In FIG. 14 time t19 is in subframe 3.

The reception operation unit then synchronizes with the satellite signal (step S28) at time t20 a certain time after time t19. In FIG. 14 time t20 is in subframe 5.

Because time t20 in reception operation process B is within the specific time after receiving the previous subframe 1 (step S150 returns No), the reception operation unit continues the reception operation process until the transmission timing of subframe 1, 4 or 5.

Because the transmission timing of subframe 1, 4 or 5 (as determined by the timing of the beginning of subframe 1, 4 or 5 in this embodiment of the invention) does not arrive until time t21 in FIG. 14 after synchronizing with the satellite signal (step S142 returns No), the reception operation unit continues the reception operation process.

Because the transmission timing of subframe 1 then comes at time t21 (step S130 returns Yes), the reception operation unit pauses at least a part of the reception operation process (step S54).

Because the transmission timing of subframe 2 then comes at time t22 (step S130 returns No), the reception operation unit resumes the reception operation process.

Because the transmission timing of subframe 4 then comes at time t23 (step S130 returns Yes), the reception operation unit pauses at least a part of the reception operation process (step S54).

Because the transmission timing of subframe 2 then comes at time t25 (step S130 returns No), the reception operation unit resumes the reception operation process.

Because the transmission timing of subframe 4 then comes at time t26 (step S130 returns Yes), the reception operation unit pauses at least a part of the reception operation process (step S54).

The reception operation unit thereafter repeats suspending and resuming the reception operation process until correcting the internal time information ends (step S46) or a time-out occurs during the reception operation process (step S50).

This fourth embodiment of the invention acquires the precise orbit information (ephemeris parameters) required to generate the positioning information during a specific period after acquiring the satellite correction data, and suspends at least a part of the reception operation process during the periods in which the satellite correction data and the coarse orbit information (almanac parameters) that are not needed to generate the positioning information are transmitted.

As a result, because operation can be reduced during three (subframes 1, 4 and 5) of the five subframes in the navigation message shown in FIG. 2A, the reception operation can be reduced to a minimum of 12 seconds/30 seconds=40%. The current consumption of a satellite signal reception device and a timekeeping device including a satellite signal reception device can therefore be reduced.

2-5 Embodiment 5

The structure and circuit configuration of a GPS wristwatch according to this fifth embodiment of the invention are the same as the structure and circuit configuration of the GPS wristwatch according to the first embodiment of the invention shown in FIG. 3 to FIG. 6, and further description thereof is thus omitted.

Positioning Information Generating Process

Figure 15:
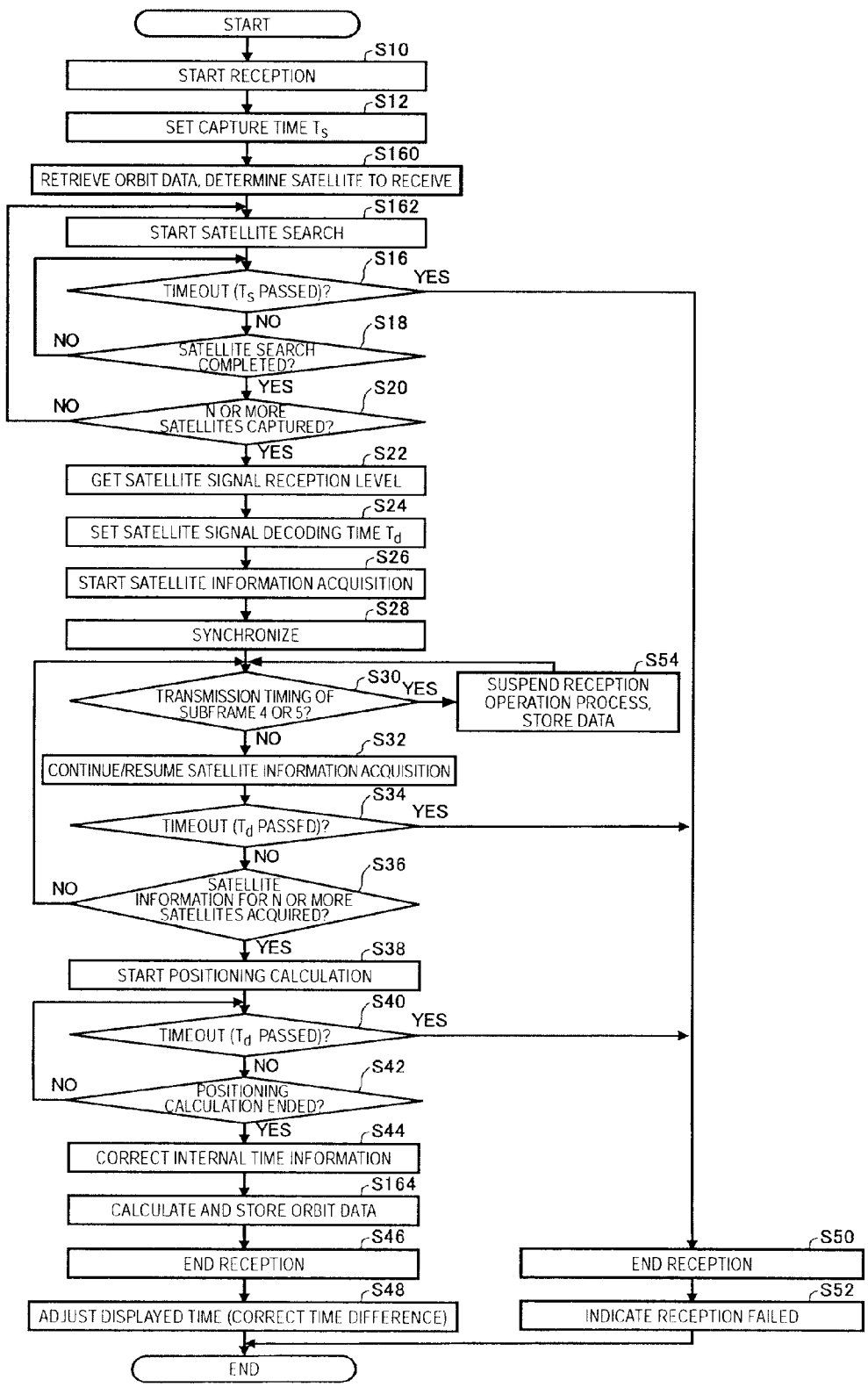
FIG. 15 is a flow chart describing an example of a positioning information generating process (positioning information acquisition mode) in a GPS wristwatch according to a fifth embodiment of the invention.

FIG. 15 is a flow chart showing an example of a positioning information generating process (positioning information acquisition mode) in a GPS wristwatch according to a fifth embodiment of the invention.

This fifth embodiment of the invention generates information corresponding to the coarse orbit information (referred to below as "orbit data") from the precise orbit information, and saves this orbit data after concluding the reception operation process. Note that identical steps in this embodiment and the first embodiment described above are identified by identical reference numerals in the flow chart shown in FIG. 7, and further detailed description thereof is omitted.

When the time difference adjustment process (positioning information acquisition mode) starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S10).

When reception starts, the baseband unit 60 (satellite search component 60-1) sets the capture time $T_s$ (step S12). This capture time $T_s$ is the time limit for completing the satellite search process described below from when the GPS device 70 starts the reception operation. The capture time $T_s$ is set, for example, to 6 seconds. Note that the capture time $T_s$ may be set before reception starts.

If the orbit data is stored in the storage unit 41 or flash memory 66 (corresponding to the second storage unit of the invention), the orbit data is read and a candidate satellite for reception is determined by predicting the location of a GPS satellite 10 from the orbit data (step S160).

The baseband unit 60 (satellite search component 60-1) then starts the satellite search step (satellite search process) based on the candidate reception satellite determined in step S160 (step S162). In the satellite search step the GPS device 70 looks for a GPS satellite 10 that can be captured.

The subsequent operation from the satellite search step until the control unit 40 (time information adjustment component 40-2) corrects the internal time information stored in the storage unit 41 using the time adjustment information (step S16 to step S44) is the same as described in the first embodiment.

After step S44, the control unit 40 creates and stores information (orbit data) comparable to the coarse orbit information (almanac parameters) from the precise orbit information (ephemeris parameters) acquired by the GPS device 70 in storage unit 41 or flash memory 66 (corresponding to the second storage unit of the invention) (step S164).

This orbit data may be the precise orbit information (ephemeris parameters) reduced to precision comparable to the coarse orbit information (almanac parameters), or it may be the precise orbit information (ephemeris parameters).

Operation from the end of reception (step S46 or step S50) is the same as described in the first embodiment.

The fifth embodiment of the invention can generate and store information comparable to the coarse orbit information (almanac parameters) from the precise orbit information (ephemeris parameters) without receiving the coarse orbit information (almanac parameters). Therefore, by using this information comparable to the coarse orbit information (almanac parameters) when the next reception operation process starts, the time required from when the reception operation process starts until a positioning information satellite (GPS satellite 10) is captured can be shortened by predicting the positioning information satellites that can currently be captured and attempting to capture those satellites.

When the positioning information satellite is a GPS satellite, it takes approximately 12 hours for the GPS satellite to complete one orbit. Therefore, if the reception time is the same time each day, satellite signals will be received from the same GPS satellites as the day before. More specifically, the time required from the start of the reception operation process until a GPS satellite is captured can be shortened by storing the coarse orbit information for particular GPS satellites, and it is not necessary to store coarse orbit information for all GPS satellites in the constellation. Therefore, when the satellite signal reception operation is executed at the same time every day either automatically or manually as a result of a manual operation, the time-saving effect of the invention is particularly good.

It should be noted that while the fifth embodiment is described as adding steps S160, S162, and S164 to the operation of the first embodiment, the same effect can be achieved by adding steps S160, S162, and S164 to the operation of the second to fourth embodiments.

The invention includes configurations that are effectively the same as the configurations of the preferred embodiments described above, including configurations with the same function, method, and effect, and configurations with the same object and effect. The invention also includes configurations that replace parts that are not fundamental to the configurations of the preferred embodiments described above. The invention also includes configurations achieving the same operational effect as the configurations of the preferred embodiments described above, as well as configurations that can achieve the same object. The invention also includes configurations that add technology known from the literature to the configurations of the preferred embodiments described above.

The foregoing embodiments are described with reference to a GPS satellite as an example of a positioning information satellite, but the positioning information satellite of the invention is not limited to a GPS satellite; rather, the invention can be used with other satellites, for example, Global Navigation Satellite Systems (GNSS) such as Galileo and GLONASS, and other positioning information satellites that transmit satellite signals containing time information, including the SBAS and other geostationary or quasi-zenith satellites.

What is claimed is:

1. A satellite signal reception device, comprising:
   a reception operation unit that executes a reception process to receive a satellite signal transmitted from a positioning information satellite;
   the satellite signal having a repeating information period including a first sub-period containing satellite correction information, a second sub-period containing precise orbit information, and a third sub-period containing coarse orbit information,
   wherein the reception operation unit executes the reception process in the second sub-period, suspends at least part of the reception process in the third sub-period, executes the reception process in a first occurrence of the first sub-period, and suspends at least part of the reception process in subsequent first sub-periods.

2. The satellite signal reception device described in claim 1, wherein:
   the reception operation unit executes a positioning information generating process to generate positioning information based on the precise orbit information contained in the satellite signal.

3. The satellite signal reception device described in claim 2, wherein:
   the reception operation unit suspends at least part of the positioning information generating process in the third sub-period and in the subsequent first sub-periods.

4. The satellite signal reception device described in claim 2, further comprising:
   a first storage unit that stores first data required for the reception process,
   wherein the first storage unit stores the first data during the third sub-period and the subsequent first sub-periods.

5. The satellite signal reception device described in claim 4, wherein:
   the first data includes at least one of frequency offset data, pseudorange data, the precise orbit information, satellite time data, and the satellite correction information for the positioning information satellite from which a satellite signal is received.

6. The satellite signal reception device described in claim 1, further comprising:
   a second storage unit;
   wherein the reception operation unit executing a coarse orbit information generating process that generates second data corresponding to the coarse orbit information from the precise orbit information, and
   the second storage unit stores the second data corresponding to the coarse orbit information.

7. The satellite signal reception device described in claim 1, wherein:
   the positioning information satellite is a GPS satellite.

8. A timekeeping device comprising the satellite signal reception device described in claim 2, the timekeeping device further comprising:

a timekeeping unit that keeps internal time information; and a time adjustment unit that corrects the internal time information;

wherein the reception operation unit generates time-zone difference adjustment information based on the positioning information; and the time adjustment unit corrects the internal time information based on the time-zone difference adjustment information.

9. A satellite signal reception method that receives a satellite signal transmitted from a positioning information satellite, the satellite signal having a repeating information period including a first sub-period containing satellite correction information, a second sub-period containing precise orbit information, and a third sub-period containing coarse orbit information, the satellite signal reception method comprising:

executing a reception process in a first occurrence of the first sub-period and in the second sub-period; and suspending at least part of the reception process in the third sub-period and suspending at least part of the reception process in the subsequent first sub-periods.

* * * * *